United States Patent [19]

Henderson, Jr. et al.

[11] Patent Number: 5,233,687
[45] Date of Patent: Aug. 3, 1993

[54] USER INTERFACE WITH MULTIPLE WORKSPACES FOR SHARING DISPLAY SYSTEM OBJECTS

[75] Inventors: D. Austin Henderson, Jr., Palo Alto; Stuart K. Card, Los Altos Hills; Maxwell, III: John T., Sunnyvale, all of Calif.

[73] Assignee: Xerox Corporation, Stamford, Conn.

[21] Appl. No.: 805,343

[22] Filed: Dec. 9, 1991

Related U.S. Application Data

[62] Division of Ser. No. 30,766, Mar. 25, 1987, Pat. No. 5,072,412.

[51] Int. Cl.⁵ .............................................. G06F 15/20
[52] U.S. Cl. ....................................................... 395/158
[58] Field of Search ................. 395/158, 159; 340/724, 340/716; 382/44-46

[56] References Cited

U.S. PATENT DOCUMENTS

| | | | |
|---|---|---|---|
| 4,658,351 | 4/1987 | Teng | 364/200 |
| 4,688,167 | 8/1987 | Agawaral | 364/200 |
| 5,072,412 | 12/1991 | Henderson, Jr. et al. | 395/158 |
| 5,088,052 | 2/1992 | Spielman et al. | 395/158 |
| 5,129,055 | 7/1992 | Yamazaki et al. | 395/158 |

OTHER PUBLICATIONS

Feiner, Steven et al., "An Experimental System for Creating and Presenting Interactive Graphical Documents," ACM Transactions on Graphics, vol. 1, No. 1, Jan. 1982, pp. 59-88.

Filing Protocol, Xerox Corporation, XNSS 108605, Publication No. 610P50679, May 1986.

NoteCards TM Release 1.2i Reference Manual, Xerox Special Information Systems, Xerox Corporation, 1985.

Primary Examiner—Heather R. Herndon

[57] ABSTRACT

Workspaces provided by an object-based user interface appear to share windows and other display objects. Each workspace's data structure includes, for each window in that workspace, a linking data structure called a placement which links to the display system object which provides that window, which may be a display system object in a preexisting window system. The placement also contains display characteristics of the window when displayed in that workspace, such as position and size. Therefore, a display system object can be linked to several workspaces by a placement in each of the workspaces' data structures, and the window it provides to each of those workspaces can have unique display characteristics. The display system object can operate continuously despite switching between one workspace and another, and the windows it provides in successive workspaces can share features so that they appear to the user to be the same window or versions of the same window. As a result, the workspaces appear to be sharing a window. Workspaces can also appear to share a window if each workspace's data structure includes data linking to another workspace with a placement to the shared window. A special workspace is automatically included in each of the other workspaces, so that windows in that workspace go with the user into any other workspace. The user can invoke a switch between workspaces by selecting a display object called a door, and a back door to the previous workspace is created automatically so that the user is not trapped in a workspace.

22 Claims, 19 Drawing Sheets

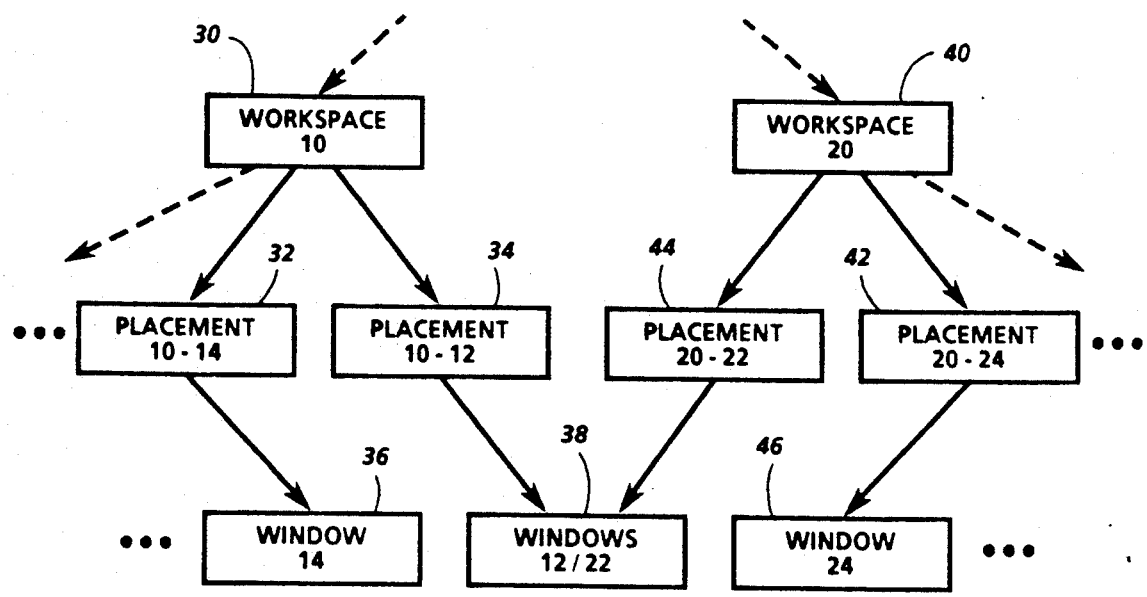
FIG. 2
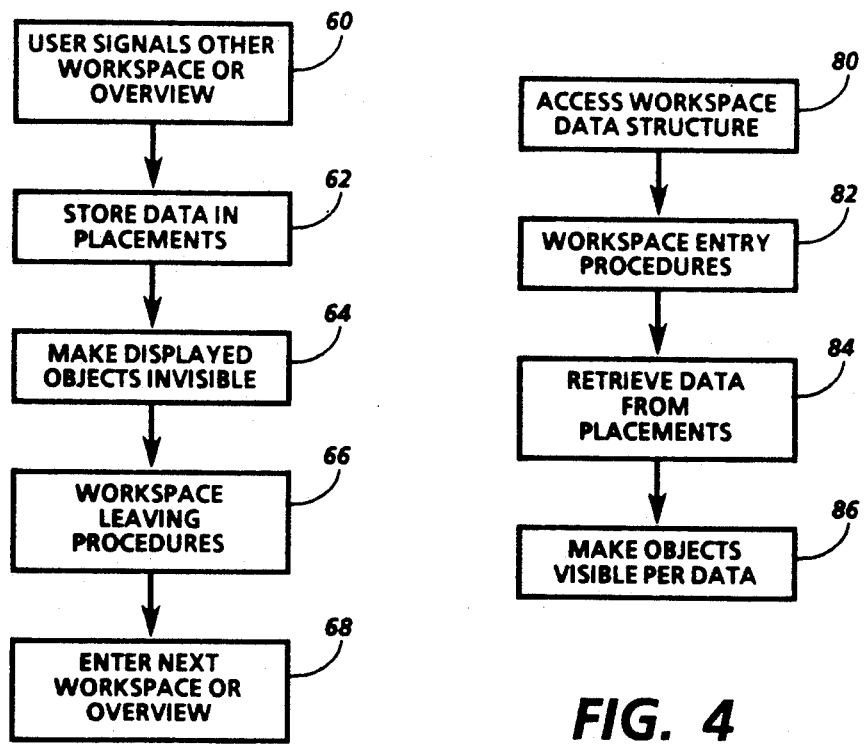
FIG. 3
FIG. 4

FIG. 5

USER INTERFACE WITH MULTIPLE WORKSPACES FOR SHARING DISPLAY SYSTEM OBJECTS

This is a division of application Ser. No. 07/030,766 filed Mar. 25, 1987 now U.S. Pat. No. 5,072,412.

BACKGROUND OF THE INVENTION

The present invention relates to the user interface of a data processing system. More specifically, the invention relates to the organization of display objects such as windows into groups which are displayed together on a display-based user interface, each group being appropriate to a particular user task.

Current user interfaces typically include various types of input/output (I/O) devices—display outputs such as a cathode ray tube (CRT) and manually operated inputs such as a keyboard and a mouse. For example, a user provides alphanumeric and other inputs using the keyboard and provides inputs indicating position on the display using the mouse. The data processing system provides a display that helps the user to provide a sequence of manual inputs which will lead to the results the user desires.

One conventional technique for helping the user of a display-based user interface is to provide visually distinct display objects on the screen, each object fulfilling a corresponding function. For example, a pointer such as an arrow can be displayed on the screen, moving in response to a mouse or other pointer control device. The pointer appears to move over a number of other display objects which the user may select. The user typically selects a selectable display object or a distinct internal part of such a display object by a pointer signal, as by pressing an appropriate button on the mouse, when the pointer is on that display object or that distinct internal part. A user selection initiates operations of the data processing system which bear some logical relation to that display object.

The selectable display objects take many forms. The term "window" is applied to selectable display objects of various types, and one typical characteristic of windows is that the effect of a pointer signal within a window depends on the pointer location. The term "menu" is usually applied to another type of display object which also has this characteristic of distinct internal locations, because a menu typically has several areas within it, each of which represents an option which the user may select with a pointer signal in that area. The term "icon", on the other hand, is usually applied to a display object which does not have this characteristic of distinct internal locations, but which is a relatively small and visually suggestive of its function. A pointer signal within an icon typically produces the same effect regardless of the pointer's location within the icon.

Conventional display-based user interfaces thus may include at least three categories of display objects: a position indicating display object, such as a pointer; selectable display objects without internal location distinctions, such as icons; and selectable display objects with internal location distinctions, such as windows and menus. In addition, the user interface includes a set of procedures according to which the data processing system responds to selections and other inputs from the user.

A central constraint on user interface design in the relatively small size of the display screen, because it limits the number of perceptible objects which can be displayed to the user at any given time. On the other hand, the user tends to switch back and forth between tasks, each relating to a different group of display objects. Bannon, L., Cypher A., Greenspan, S. and Monty, M. L., in *Proceedings of the ACM Human Factors in Software Conference, CHI '83*, (1983), pp. 54–57 and in a talk delivered at CHI '83, San Francisco, December 1983, describe a number of reasons for task switching. As a result of task switching, the relatively small display typically becomes cluttered with a large number of objects, many of which are not relevant to the current task.

One set of techniques permits the user to reduce cluttering by distorting display objects within the workspace which appears on the screen. Smith, D., "Pygmalion", PhD Thesis, Dept. of Computer Science, Stanford University, 1975, described the shrinking of windows to icons or small pictures reminding the user of the contents of the window. Goldberg, A., *Smalltalk-80—The Interactive Programming Environment*, Addison-Wesley, Reading, Mass., 1984, describes the user interface of the Smalltalk-80 system, in which a rectangular area on the display in which information may be accessed is called a "view" rather than a window, and in which views may overlap, allowing windows to cover each other, leaving only a portion to remind the user of what lies behind. Smalltalk permits two independent views of a single application, so that modifications of the data engaged by that application in one view are visible in the other view, even though the two views are produced by different objects in the system. Furnas, G., "Generalized Fisheye Views", in Mantei, M. and Orbeton, P. (eds.), *Human Factors in Computing Systems-III, Proceedings of the CHI '86 Conference*, Boston, April 1986, pp. 16–23, describes a fish-eye distortion technique in which all the objects are forced to fit by selectively showing objects based on their intrinsic importance and the user's current focus of attention. Spence, R. and Apperly, M., "Data Base Navigation: An Office Environment for the Professional", *Behavior and Information Technology*, Vol. 1, No. 1 (1982), pp. 43–54 describes a similar technique. DiSessa, A., "A Principled Design for an Integrated Computational Environment", *Human-Computer Interaction*, Vol. 1, No. 1 (1985), pp. 1–47, described a spatial box metaphor in which boxes are nested in a hierarchy, and individual boxes can either appear expanded or shrunk to a symbol, depending on the user's position in the hierarchy.

Several other techniques permit the user to reduce cluttering by allocating screen usage between a number of tasks based on a desktop metaphor. Smith, D. C., Irby, C., Kimball, R., Verplank, B., and Harslem, E., "Designing the Star User Interface", *BYTE*, Vol. 7, No. 4 (April 1982), pp. 242–282, described the Xerox Star user interface which employs a desktop metaphor, with icons representing familiar items which would appear on one's desk or in one's office, such as a document, a file folder, or a file drawer. In this type of user interface, the allocation of screen space can be switched from one display system object to another by, for example, shrinking the windows of one task to icons and expanding the icons of another task to windows. G. Willians, "The Lisa Computer System", *BYTE*, February 1983, pp. 33–50, describes the Lisa user interface which, like the Xerox Star, employs a desktop metaphor; at pages 36–38, Williams describes icons and windows which appear on the desktop, and also describes a window capable of containing icons. The further development of these features in the Macintosh user interface is described in the MacWrite Manual and the MacPaint Manual published by Apple Computer, Inc.

Other techniques are based on a large virtual workspace metaphor in which the screen is thought of as a movable viewport onto the workspace. Sutherland, I. E., "Sketchpad: A Man-machine Graphical Communication System", *AFIPS Spring Joint Computer Conference*, Vol. 23, (1963), pp. 329-346, describes Sketchpad, an early graphical program using this technique. Bolt, R. A., *The Human Interface*, Lifetime Learning Publications, Belmont, Calif. (1984), describes Dataland, in which color pictorial and textual data are arranged in three screens, one for an overview of the whole space, one for a detailed view of some portion of the space, and one touch-screen for control. The user can translate the detailed view to a different area or zoom to obtain more detail. Donahue, J. and Widom, J., "Whiteboards: A Graphical Database Tool", *ACM Transactions on Office Information Systems*, January 1986, Vol. 4, No. 1, pp. 24-41, describe operations for examining the contents of a Whiteboard display within which objects have spatial locations. Fisher, S. S., McGreevy, M., Humphries, J. and Robinett, W., "Virtual Environment Display System", presented at ACM Workshop on Interactive 3D Graphics, Chapel Hill, N.C., October 1986, which is not prior art in relation to the present invention, describe head-mounted displays used by NASA to monitor user head and body movements and provide a complete simulated three-dimensional visual space.

Another set of techniques provide multiple virtual workspaces, allowing more convenient access to non-displayed display objects by switching quickly from one virtual workspace to another. At pages 42, 49 and 67-73, Goldberg, cited above, describes a Smalltalk display object called a "project", which is a collection of views which takes up the entire display. The projects are organized hierachically, so that one path to each project is through a window, referred to as a "door", which appears in the display of the project in which it is created, called its parent. The user can return to the current project's parent by selecting a menu command "exit project". At pages 322-339, Goldberg describes a project browser which can also be used to access a project. The project browser has two subviews, one containing a list menu with the titles of all existing projects and the other containing editable text which describes a project being created or accessed.

Bolt, cited above, and Herot, C. F., "Spatial Management of Data", *ACM Trans. on Database Systems*, Vol. 5, No. 4 (December 1980), pp. 493-514, describe the CCA system, a further development of Dataland, in which the user is swept into a subworkspace upon zooming close enough to a port, the subworkspaces being arranged hierarchically.

Chan, P. P., *Learning Considerations in User Interface Design: The Room Model*, (Report CS-84-16), University of Waterloo Computer Science Department, Waterloo, Ontario, Canada, 1984, in Chapter 3, proposes another type of multiple virtual workspaces, the Room user interface. In this interface, a group of icons is displayed in a container called a room, with some of the icons being door icons which, when selected, result in the display of a different room. At page 26, Chan compares this with the Xerox Star user interface, noting that the Room user interface provides "multiple desktops" in the form of multiple rooms, made possible by the door icons. In Chapter 5, Chan describes the hierarchical data structure within which each room contains the data structure of each of its icons. Chan notes in Chapter 6 that the desktop model of Xerox Star provides a single workspace, requiring the user to waste time rearranging the displayed objects, while the room model reduces this form of waste. Chan also suggests a number of additional features, including a higher level display system object for manipulating rooms and, when the attributes of an icon are being examined, growing the icon as much as necessary and leaving other icons partially visible behind the opened icon.

Feiner, S., Nagy, S., and Van Dam, A., "An Experimental System for Creating and Presenting Interactive Graphical Documents", *ACM Trans. on Graphics*, Vol. 1, No. 1 (January 1982), pp. 59-77, describe documents which are directed graphs whose nodes are referred to as pages. The pages are organized into subchapters and chapters. A page may contain a button which can provide access to another page.

Hypertext systems typically include small, often textual, networks of displayed data units connected with arbitrary patterns of typed links providing paths between locations within the data units. PROMIS, described by Hurst, J. and Walker, K. (eds.), *The Problem-Oriented System*, MEDCOM Press, New York (1972), and ZOG, described by Robertson, G., McCracken, D. and Newell, A., "The ZOG Approach to Man-Machine Communication", *Int'l Journal of Man-Machine Studies*, Vol. 14, No. 4, May 1981, pp. 461-488, each display a single data unit at a time. NLS, described by Engelbart, D. E. and English, W. K., "A Research Center for Augmenting Human Intellect", *Proceedings of the AFIPS Fall Joint Computer Conference*, Vol. 33 (1968), pp. 395-410, provides access to a subtree of data units if screen space permits. Notecards, a product of Xerox Corporation, provides access to any arbitrary set of data units.

A problem shared by the large virtual workspace techniques and the multiple virtual workspace techniques is that the user needs help navigating. In the large virtual workspaces such as Dataland, the user may navigate much as in space, by translating and zooming, and may be assisted by having both global and local views. In multiple virtual workspaces such as Smalltalk projects, the project browser similarly can relate a limited number of projects for user navigation. In the hypertext systems such as the electronic book and Note-Cards, browsers may be used as well as presentations of local connections between workspaces.

Some related features have been described in the patent literature. Ikegami et al., European Patent Application Publication No. 0,108,520, describe a method of controlling windows to display card images lengthwise on a display; a group of card images may be processed as a box, as explained at pages 4-5. Cason et al., U.S. Pat. No. 4,484,302, describe multiple virtual displays at columns 2 and 5. Shaw et al., U.S. Pat. No. 4,598,384, describe at column 2 a graphics display with independent windows, several of which may be simultaneously operated from one or more application programs. Pike, U.S. Pat. No. 4,555,775, describes graphics software under which each of several bitmap layers or windows is always active regardless of its visibility, beginning at column 1. Tabata et al., U.S. Pat. No. 4,574,364, describe a display technique in which a window management table is used to manage the information about plural windows.

It would be advantageous to have a more useful multiple workspace user interface.

SUMMARY OF THE INVENTION

The present invention provides a multiple workspace user interface which has a number of useful features.

One aspect of the invention is to provide techniques for switching from one workspace display to another. The user can organize a collection of tools such as windows or other display objects into groups, with the tools of each group being linked to a respective workspace so that they are displayed when it is. A display system object can be linked to more than one workspace, to provide a respective tool in each of those workspaces. If the user provides signals causing a switch from one of those workspaces to another, the respective tools share features so that the user perceives them as the same tool, and the state of the display system object maintains continuity.

Another aspect of the invention is to provide linking data structures which can be used to link workspace data structures to the display system objects of a preexisting object-based display system. Each display system object in such a system provides a respective independent display object set, by providing each display object in that set for display and by receiving signals relating to each such display object and responding to those signals. A workspace system can be added to the display system by providing workspace data structures and procedures and by linking the workspace data structures to the display system objects using placements. More than one placement can link to the same display system object. Each placement may contain a handle for the linked object and display characteristics, such as position and size, according to which that display system object provides a display object in the linked workspace.

Another aspect of the invention is to provide techniques for leaving and entering workspaces so that the user, upon reentering a workspace, can recognize it based on its organization. In leaving a workspace, the display characteristics of the display objects are stored in the placements which link their display system objects to the workspace's data structure. When that workspace is reentered, the placements are accessed to retrieve the display characteristics, which are then provided to the display system object.

Another aspect of the invention is to provide aids to navigation between workspaces. A special navigational display called the overview can be entered from a workspace. The overview includes a pictogram representing each of the existing workspaces, within which are window pictograms representing each window within that workspace. The user may select a window pictogram to obtain more information about the corresponding display object. The user may select a workspace pictogram to enter that workspace, leaving the overview.

Another aspect of the invention is to provide techniques for the apparent transfer of display objects from one workspace to another. Although a display object cannot be transferred between workspaces, the user may select a display object and cause its apparent transfer to another workspace. The user may, for example, transfer the pictogram representing that display object between workspaces in the overview, in which case a new placement is created linking to the new workspace. The user can also move the pictogram into an included workspace, in which case it will appear to be transferred into each of the other workspaces which include that workspace. The user could put the display object into a special workspace which is effectively included in all the other workspaces. Or the user could pick up the display object in leaving one workspace so that it will be transferred into the next workspace to be entered, in which case a placement will be created linking the display object to the next workspace.

Another aspect of the invention provides techniques for manipulating workspaces, including file operations on groups of workspaces. By a save operation, descriptors of the display system objects to which the selected workspaces are linked are stored in a file and the linking placements are changed so that they contain file handles, so that the workspace data structures can be stored in the file in a form which permits recreation of the workspaces. By a restore or augment operation, the display system objects are recreated from their descriptors and their new display system handles are used to modify the linking placements so that the workspace data structures are again linked to the display system objects and the workspaces can be displayed. These file operations can be used to deliver applications.

These and other objects, features and advantages of the present invention will be more fully understood from the following description together with the claims and drawings.

BRIEF DESCRIPTION OF THE DRAWINGS

FIG. 2 is a schematic diagram of workspace data structures with associated placements.

FIG. 3 is a flowchart showing steps for leaving a workspace.

FIG. 4 is a flowchart showing steps for entering a workspace.

FIG. 5 is an example of an overview display showing representations of workspaces.

DETAILED DESCRIPTION

A. Conceptual Framework

Figure 1A:
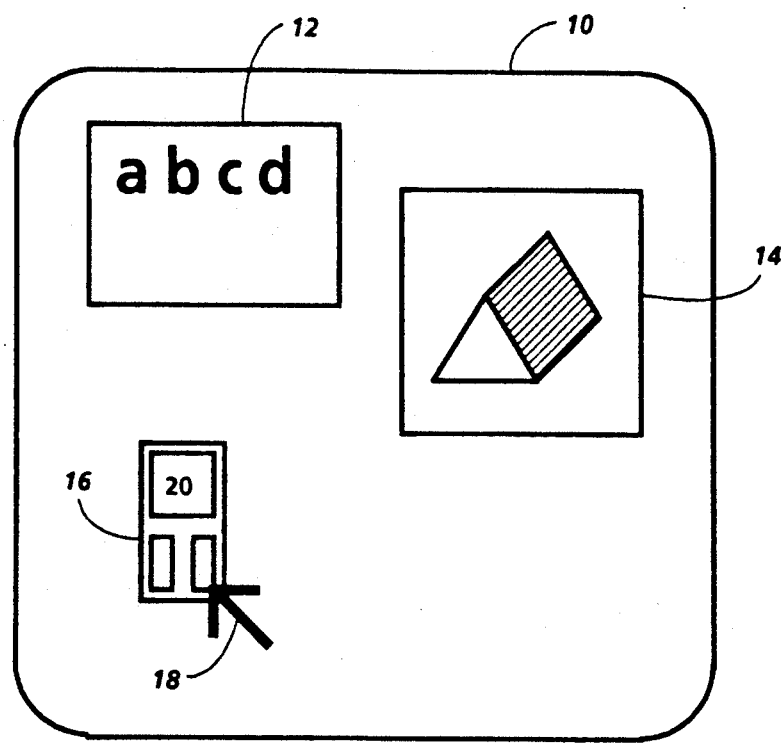
FIG. 1A is a schematic diagram of the display of a first workspace.

The following terms provide a conceptual framework for describing the present invention.

A "display object" is defined herein as a visually distinguishable display feature or set of features which is coherent, in the sense of sticking together in a display. An alphanumeric character is a common display object, and early user interfaces typically were only capable of displaying such objects. Windows and icons, described above, are more advanced display objects. Some display objects, such as characters within an icon's label, may not be separately user selectable, while others, such as the icon itself, may be selected for the performance of a specified operation. The types of display objects available, the manner in which they are selected and the available operations are all characteristics of the particular system providing the display, and the system includes hardware and software components.

The term "container" is defined herein to mean a display object which may contain other display objects within its boundaries. A window is an example of a container because it may be occupied by a number of characters or other display objects. A window is itself a display object, however, so that the display characteristics of the window, including its dimensions, place a constraint on the display objects it contains. A container such as a window may, however, remain invisible when displayed, even though display objects it contains are visible. Also, a container may be location sensitive, meaning that a user selectable display feature within it may be selected by user signals indicating the location of that feature. In general, a container may be analyzed into display characteristics, such as position, size and other features which depend on the particular presentation, and its contents, including the display objects and other features which do not depend on the particular presentation.

The term "display system" is defined herein to mean a system for managing or controlling a display. A display system is therefore an example of the more general term "user interface", meaning a system for receiving signals from a user or for providing signals to a user, or both. The user interface will typically be one of a number of subsystems within an overall system.

An "object-based display system" is a display system that presents a number of display objects as if each was an independent object, meaning that each of those display object appears to the user as if it were receiving signals from the user and responding to those signals independently from the other display objects, according to its own receiving and response procedures. The display objects that are managed in this manner may include containers such as windows and also non-containers such as icons. An object-based display system may also present several display objects as if they were not independent, such as two windows that differ in position and size but have the same contents or a window and its icon or shrunken form. Each group of display objects that are not independent of each other but that are independent of all other display objects is referred to herein as an "independent display object set". An object-based display system can be implemented in a multitude of ways. An object-based display system for managing windows, for example, is referred to herein as a "window system", and each independent display object set in a window system can be interactively manipulated independently of other windows not in that set.

The term "display system object" is defined herein to mean the means within an object-based display system for providing a corresponding independent display object set, meaning that the display system object provides the visible features of each of the display objects in that display object set and receives and responds to user signals relating to those display objects. A display system object may include one or more data structures and a number of procedures, and a data structure or procedure such as an editor or other application could be called by more than one display system object, each of which also includes a respective set of changeable display characteristics for presenting the corresponding display objects. Each window in a window system, for example, is provided by a display system object, which determines not only the contents of the window but also the display characteristics of the window. A single display system object may provide more than one window if those two windows are not independent of each other and may also provide an icon or shrunken form of a window it provides. A display system object is one instance of the more general term "signal source", meaning any means for generating data that a user can perceive.

The term "display workspace", or simply "workspace", is defined herein to mean the display system entity that includes a collection of display objects together with spatial display relations between them. A workspace is referred to as being displayed when the display objects in it are available for display in accordance with the spatial display relations they have within that workspace. The workspace itself need not be visible as a distinct display object when it is displayed and could occupy the entire display area. The display objects within it may be user selectable, and if a display object is selectable by user signals indicating its location within the display, the workspace is location sensitive. A display system or part of a display system that manages or controls workspaces is termed a "workspace system". A workspace system may be implemented in many ways, some of which are described below.

A workspace system may provide only one workspace that is always displayed, or it may provide more than one workspace, in which case one or more of the workspaces may not be displayed at times. Workspaces may thus be referred to as "virtual workspaces", with the display objects in each workspace being available for display when that workspace is displayed. In other words, the workspace itself is virtual, yet a part of it may be made real by being displayed.

The more general term "perceptual space", or simply "space", is used herein to refer to any range of perception that may be occupied by signals which are distinguishable by a user. A display workspace is but one example of a space, the type of space that display objects like windows and icons may occupy. Another example of space would be the perceptual space that different tones or voices may occupy.

In general, the distinguishable signals generated by a user interface, whether windows or voices, may be referred to as "user interface objects". An "object-based user interface system" is one that can provide a number independent user interface objects, meaning that each of these objects seems to the user to be receiving signals from the user and responding to those signals independently from the other objects, according to its own receiving and response procedures. An object-based user interface system may also present several user interface objects as if they were not independent, and each group of objects that are not independent of each other but that are independent of all other objects is referred to herein as an "independent interface object set". An "interface system object" is the means within an object-based user interface system for providing each of the user interface objects in a given independent interface object set and for receiving and responding to user signals relating to those user interface objects.

The above terms have the meanings indicated above both in the following description and in the attached claims.

B. General Features

FIGS. 1-9 illustrate a number of general features of the present invention, including switching from the display of one workspace to another; placements linking display objects to workspaces; methods of leaving and entering workspaces; aids to navigating between workspaces; techniques for transferring display objects from one workspace to another; the inclusion of a workspace in another workspace; techniques for manipulating workspaces; and techniques for transferring a group of workspaces.

Figure 1B:
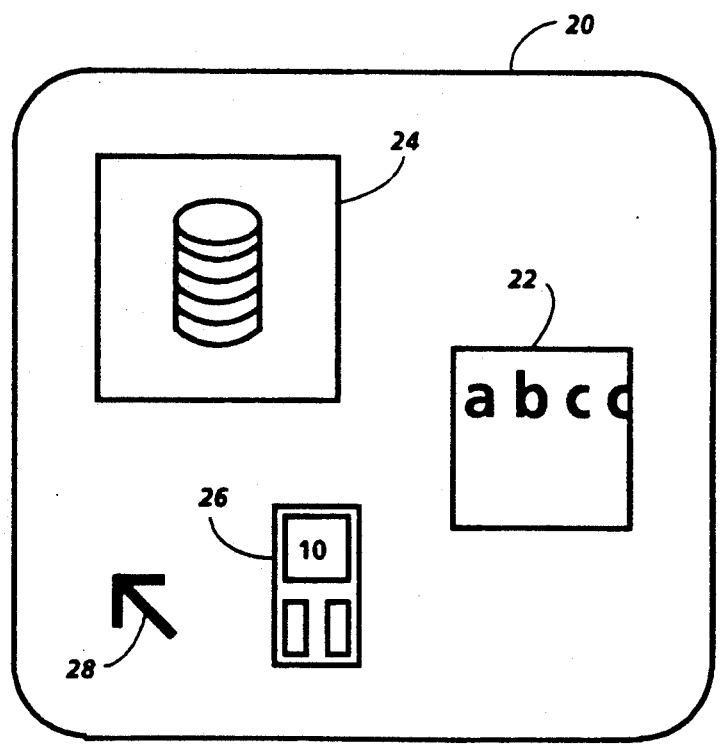
FIG. 1B is a schematic diagram of the display of a second workspace displayed.

1. Workspace Display Switching. FIGS. 1A and 1B each show a respective display screen presenting a plurality of display objects. These display screen are examples of workspace displays, each displaying part or all of a workspace occupied by a number of distinguishable display objects, such as windows and icons.

Workspace display 10 in FIG. 1A is a display of a first workspace, which includes windows 12 and 14 and icon 16, positioned within display 10 in accordance with their spatial relations within the first workspace. Window 12 presents several alphabetic characters from a text editing application and window 14 presents a triangular solid from a graphics application. Each of these windows may be location sensitive, so that the user, by selecting a location within a window and invoking an operation, can send a signal corresponding to that location to the display system object providing that window. For example, in an editing window, the user may modify a display feature by selecting the location at which that feature is displayed and invoking an editing operation. Door icon 16, on the other hand, is not location sensitive. Pointer 18 is currently pointing at door icon 16, and if the user provides a select signal at this time, door icon 16 will be selected as a unit, without regard to the position of pointer 18 within the icon. The user may then invoke a door opening operation, causing workspace display 10 to disappear and workspace display 20 to appear, as shown in FIG. 1B.

Workspace display 20 is a display of a second workspace, which includes windows 22 and 24 and icon 26, positioned in accordance with their spatial relations within the second workspace. Window 22, which is provided by the same display system object as window 12 in workspace display 10, is presented in a different location on the screen and with different dimensions than window 12, as can be seen from the cutting off of the character "d". Window 24 presents a cylindrical solid from another graphics application and a different door icon 26, a "back door" that can be used to return to workspace display 10.

Workspace displays 10 and 20 each include a group of display objects as described above. As noted, two of those display objects, windows 12 and 22, are provided by the same display system object, which calls a text editing application as one of its procedures. If the user edits the contents of window 12 and then uses door icon 16 to enter workspace display 20, the changes made will be reflected in the contents of window 22 and the state of the underlying display system object will be continuous. It is also possible for the user to remove window 12 from workspace display 10 without removing window 22 from workspace display 20.

Windows 12 and 22 illustrate the phenomenon of object constancy, under which two successively displayed objects are perceived as the same object. Object constancy can result from many cues, including position, size, context, contents, labels, history and so forth. Here, windows 12 and 22 appear to be the same object despite having different display characteristics, including different positions, sizes and contexts. But because they each contain a fragment of shared text, the user typically perceives them as the same object. That perception is reinforced if they also share response procedures so that user invoked operations, such as scrolling or selecting and operating on contents, have the same effect in each window. Other shared features which can result in object constancy include sharing of an application, such as an editor; sharing of data; sharing of the state of the application as applied to the data; sharing of a history of continuous operation without interruption, i.e. without disengaging the application from the data.

The above described features of the present invention are based on the recognition of a problem which previous user interface techniques have not completely solved, the problem of tool faulting, which precludes fast task switching. Tool faulting is not limited to a display-based user interface, but occurs in any object-based user interface. Each user interface object in effect serves as a tool, and the user treats each tool as an external memory or processor that augments the user's own capabilities. These tools could be display objects, audible objects or entities, mechanical gesturing objects, tactile objects or objects providing any other signal perceptible by the user.

The invention is based in part on the recognition that a user's activities are organized around tasks, during each of which the user employs a collection of tools appropriate to that task. This phenomenon is called locality of reference, meaning that within any given short period of time the number of different tools employed will be small while the number of instances of use of each tool employed is relatively high. Therefore, references to tools occur in clusters. These clusters are separated, however, by distinct task switches, during which the user stops employing one collection of tools and begins to employ a different collection. When the task switch is completed, a cluster of references to the new collection of tools will occur, followed by another task switch, and so forth.

The problem can be understood more fully by considering the capacity and access time of such a tool. If the user interface is display-based, for example, the number of display objects to which the user has direct access limited by the size of the display. The user tends to increase the number of visible display objects and also to increase the size of each display object in accordance with current needs, up to the limit imposed by the display size. This tendency conflicts, however, with the need for a different set of tools when a task switch occurs.

During a task switch, the user needs fast access to the tools associated with the new task that are not currently available, and the process of accessing each such tool is referred to as a tool fault, during which the user does whatever is necessary to find that tool and make it available for use. In a display-based user interface, for example, it may be necessary to obtain a window with a command or a menu or by expanding an icon or it may be necessary to make a window visible by making it the top window or by inactivating, resizing or moving other windows. A tool fault thus provides access to a tool which is unavailable on the display but needed; and the amount of time spent by the tool fault may be greater if the tools being used previously required a large amount of display area. In other words, there may be a tradeoff between the display area currently being used and the access time for a different set of tools.

The present invention is further based on the recognition that this problem cannot be solved simply by organizing the tools into mutually exclusive groups between which the user can switch. The user may require a given tool during a number of tasks. If the tools are organized into mutually exclusive groups, a great deal of tool faulting will still be necessary to access such tools.

The present invention solves this problem by enabling the user to organize the tools into groups among which tools may effectively be shared and between which the user can rapidly switch. The tools of each group occupy a respective perceptual space and, when presented to the user, are free to occupy substantially all of the system-to-user capacity of that space. The user is able to provide a sequence of signals that causes a switch from one space to another space. When the user switches from a first space to a second space, as by going from one workspace to another using a door icon in a display-based interface, tool faulting occurs much more rapidly for the group of tools than if the user had to handle each tool fault individually. And if the first and second workspaces share a tool, a first display object in the first workspace and a second display object in the second workspace share features so that the user perceives them as the same display object or tool and can continue working with the second display object on that basis. Therefore, the invention permits fast and effective task switching.

2. Placements. Another aspect of the invention is based on the recognition that a number of software systems which provide display objects such as windows and icons already exist. Because a window system requires voluminous software, it is undesirable to rewrite the entire window system software in order to implement the above described features of the invention. This aspect of the invention is based on the discovery of techniques for implementing workspaces with an existing window system without extensively modifying the existing window system's software. Because some of those techniques permit a distinction between the window system which manages the windows and the workspace system within which the windows are displayed, the window system and the workspace system can develop separately.

FIG. 2 illustrates part of a data structure used in implementing the invention in a manner requiring only minimal changes in a window system used with it. The data structure includes workspace data structure 30 for workspace 10 displayed in FIG. 1A, and this workspace data structure has a number of associated data structures including placements 32 and 34. A placement is a data structure which links a respective workspace to a display object included in that workspace. A placement may also include data about the display characteristics of that display object when displayed within that workspace, from which the spatial display relations of that display object to other display objects in that workspace may be determined. For example, workspace data structure 30 includes data for providing workspace display 10, while placement 32 provides the location and size of window 14 and placement 34 provides the location and size of window 12.

Each placement is linked to a display system object, and if the workspace system is implemented with preexisting window system each display system object is within the window system. When a workspace display is set up, each placement linked to its workspace data structure provides the location and size of a window or other display object to the display system object which provides that window. Placements 32 and 34 respectively link display system objects 36 and 38 to workspace data structure 30 so that windows 14 and 12 are presented in workspace display 10. Similarly, placements 42 and 44 link display system objects 46 and 38 to workspace data structure 40 so that windows 24 and 22 are presented in workspace display 20. Placements, not shown, could also link display system objects to the workspaces so that doors 16 and 26 are presented.

Because a display system object may be linked by different placements to different workspaces, the contents it provides may be displayed differently in those workspaces. For example, placements 34 and 44 in FIG. 2 link workspace data structures 30 and 40 with shared display system object 38, making it possible for window 12 in workspace display 10 to have the same contents and receiving and response procedures as window 22 in workspace display 20 while having a different position and size. At the same time, placement 32 retains display placement data about window 14 in workspace display 10 even while workspace display 20 is visible so that when the user selects door icon 26, workspace display 10 returns with window 14 presented at the appropriate position and size. Placements thus make it possible for each of a number of windows with the same visible contents and receiving and response procedures to appear in a respective workspace at a unique position and size. This is possible even though the shared contents and procedures of all of the windows are from a single display system object which is part of an independent window system. This feature of placements is also applicable to display objects other than windows.

3. Leaving and Entering a Workspace. Another aspect of the present invention is based on the recognition that the transition from one workspace to another may be confusing to the user unless the newly displayed workspace has some distinctive identifying characteristics and familiar organization and contents. This problem is closely related to the problem of fast task resumption, because a user in not able to resume a task quickly unless the display provides cues about the user'previous place in that task. This aspect of the invention is based on the discovery of techniques which assist the user in recognizing a newly displayed workspace. One technique is to provide identifying visual features such as a distinctive background or name to appear with the newly displayed workspace. In order to give the user a sense of familiarity with the organization of the workspace, however, it is also important that the display objects within the workspace appear with the same organization as when the user last left that workspace. Also, the contents of each window, to the extent not modified through windows in other workspaces, should appear the same as when the user last left. In order to return the display objects to the same state, appropriate information must be stored when the user leaves a workspace.

FIG. 3 shows a sequence of steps for leaving a workspace according to the invention. In box 60, the user initiates the operation of leaving a workspace by signaling that the display system should displayed another workspace or the overview, a user interface feature discussed below. In either case, it is necessary to preserve the state of the currently displayed workspace before leaving it, and the system will lock out the user temporarily so that it can perform the necessary steps to do so.

In box 62, the system stores data about the currently displayed objects in the placements which link them to the currently displayed workspace. This data may be retrieved based on the changes the user has made while in the current workspace, as discussed in more detail below. Some or all of this data could alternatively be maintained during operations in the current workspace by updating a list of the placements controlling currently displayed objects whenever an operation changes the data in a placement. In either case, the data stored in the placements includes any feature of each display object which can be different when it is displayed in different workspaces. Therefore, the placement data should include at least the position and size of the display object, and may also include other features of its appearance. It is necessary to store this data so that when the user again enters this workspace, the display objects in it can be caused to appear the same as when the user left.

The system proceeds in box 64 to make the display objects in the current workspace invisible. Because display objects with the same contents may appear in other workspaces, the contents may be modified before the user reenters the current workspace. Therefore, it is not possible to ensure that the contents will remain the same. But each display object must be removed from the display so that the next workspace can be displayed, and the display system object providing the contents of each active display object such as an open window should be kept active. When those contents are next displayed, either in another workspace or upon reentering this workspace, they should be the same as when this workspace was left, and the state of the display system object providing them should be continuously active, without interruption. One technique for removing the contents of a window without changing the state of the respective display system object is to cause the display system object to provide those contents to a dummy position, called a "hiding place" herein, in which they will ignored in creating the display. While those contents are being provided to the hiding place, it is important that the display system object not receive user signals, of course, and it is convenient to think of the display system object itself as being in the hiding place. Another technique is to use a boolean variable in the display system object to cause it to stop displaying any display object until that boolean variable is reset. Whatever technique is used, each display object would be invisible upon completion of the step in box 64 and would remain invisible until displayed again in a workspace.

The step in box 66 provides for procedures upon leaving a workspace, which may be unique to that workspace. Procedures in box 66 may preserve useful information about the workspace itself, as opposed to the steps in boxes 62 and 64 which preserve useful information about the workspace's placements and their respective display system objects. For example, an identifier of the current workspace may be stored in a location which indicates that it is the previous workspace. In addition, information may be stored about the manner in which it was left. Procedures may be performed for transferring the contents of a display object in the current workspace to a new display object provided by the same display system object in the next workspace. Also, user supplied procedures for modifying the system, for example by changing global variables, may be performed. When all of these procedures are completed, the system enters the next workspace or the overview, in box 68.

FIG. 4 shows a sequence of steps for entering a workspace, which is generally the reserve of the sequence in FIG. 3. In box 80, the workspace's data structure is accessed using an identifier of that workspace. The workspace identifier may result from a user signal to enter that workspace. Upon accessing the workspace's data structure, its entry procedures are performed in box 82. Those procedures may include providing a way to return to the previous workspace and storing this workspace's identifier in a location indicating it is the current workspace. In box 84, the system retrieves the data about the display objects in this workspace from the placements associated with this workspace's data structure. The linked display objects are then made visible in accordance with that data in box 86, which includes moving them from the hiding place to a location within the display. At this point, the system is ready to receive further user inputs.

The process of leaving and entering a workspace, as shown in FIGS. 3 and 4, thus returns the display objects in a newly displayed workspace to approximately the same state as when the user last left that workspace. The invention thus solves the problem of fast task resumption, because the user is ordinarily able to recall the resumed task based on the organization and contents of its display objects.

4. Navigation Aids. Another aspect of the invention is based on the recognition that the user must have the ability to navigate efficiently between workspaces. This problem involves several more specific problems The user is very likely to need an efficient way to return to the previous workspace. The user should be able to find and enter any other workspace. The user should be able to find a desired display object in any other workspace.

A return to the previous workspace can be provided by crating a back door to the previous workspace in the step in box 82 in FIG. 4. Also, access to any other workspace can be provided by a pop-up menu with a list of all existing workspace names. But it would be beneficial to have a more powerful navigation tool.

This aspect of the invention is further based on the recognition that many navigational problems can be solved with a user interface feature which displays the existing workspaces together with information which assists the user in finding display objects within workspace. In accordance with the invention, this feature is implemented by a special display referred to as the overview.

Figure 5:
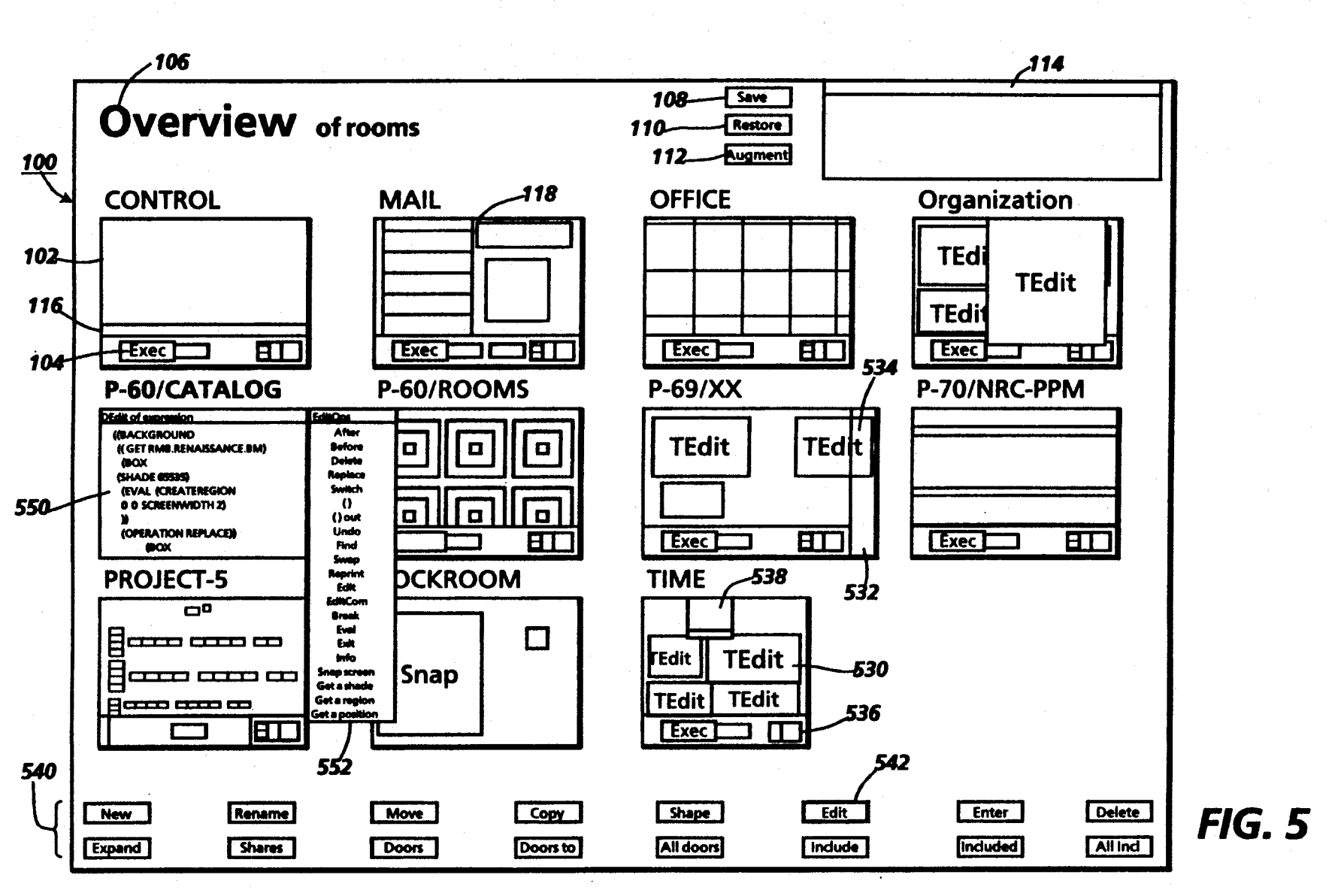

FIG. 5 shows overview 100, with eleven currently existing workspaces, each represented by a pictogram. Workspace pictogram 102, for example, represents a workspace named "CONTROL". Each workspace pictogram shows the general organization of display objects within the respective workspace. Workspace pictogram 102, for example, includes window pictogram 104, and the user can, by an appropriate sequence of signals, obtain more information about the contents of the window corresponding to pictogram 104 or any other display object within overview 100.

Figure 6:
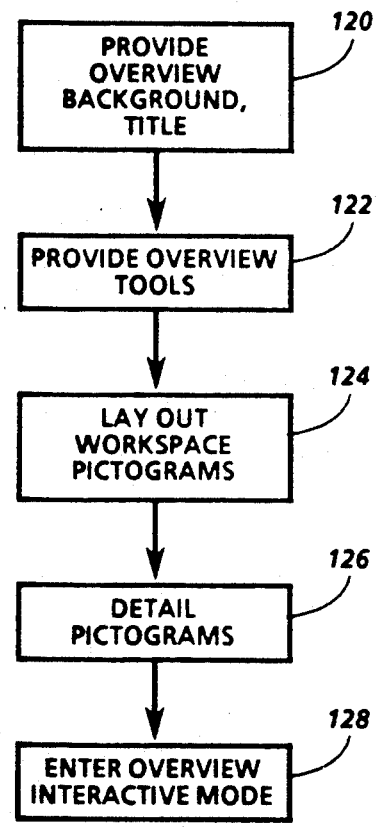
FIG. 6 is a flowchart showing steps for entering the overview.

FIG. 6 shows a sequence of steps for entering overview 100 which can be understood with reference to FIG. 5. The sequence begins in box 120 with the step of providing inactive display features of overview 100 such as the background pattern and title 106. The title in FIG. 5 is "Overview of rooms", a title which includes the word ROOMS, a trademark of Xerox Corporation used in connection with one implementation of the present invention. The step in box 122 provides a number of display features of overview 100 which, although independent of the currently existing workspaces and their contents, are display tools for facilitating user actions, such as buttons 108, 110 and 112 and prompt window 114. The user may use buttons 108, 110 and 112 to save, restore and augment operations on a group of workspaces, and may receive prompt massages through prompt window 114. These and other display tools of overview 100 are discussed in more detail below.

The sequence of FIG. 6 continues with the layout of the workspace pictograms, in box 124. In this step, the system goes through the existing workspaces and determines how they should be laid out on the display. A position and size may be assigned to each of the workspaces so that the workspace pictograms will be displayed in a sequence, such as the alphabetical order shown in FIG. 5.

The step in box 126 continues by generating the detail for each workspace pictogram. This step may involve retrieving data from the placements associated with each workspace about the position and size of each display object within that workspace. The display system object linked to each placement could also be accessed to retrieve data about the contents of the respective display object, in which case the display object pictogram could include more information about the contents. Rather than accessing the placements and the display system objects to provide each pictogram every time the overview is displayed, however, this step may involve determining whether a given workspace has changed since the overview was last displayed. If not, the previous pictogram can be retrieved from an overview cache saving the previously displayed pictograms.

When the pictograms have been laid out and detailed, the step in box 128 switches the system into an overview interactive mode, in which the user inputs are handled by procedures appropriate to the overview rather than to the underlying window system. In effect, the window system enters a special state with a special set of display objects and with special procedures to implement the overview.

Figure 7:
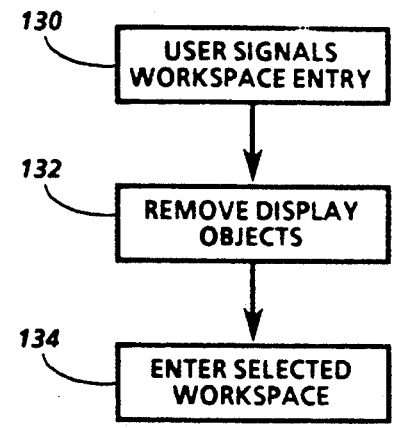
FIG. 7 is a flowchart showing steps for exiting the overview.

The manner in which inputs are handled in the overview interactive mode is described in greater detail below, but the user is able to provide sequences of inputs which, for example, cause the system to leave the overview and enter a selected workspace or which cause the respective display object of a selected display object pictogram to appear at a position and size determined by its placement, showing its current contents. Thus the overview interactive mode facilitates user navigation by permitting the user to move to any workspace or to find any desired display object. FIG. 7 shows a short sequence of steps for leaving the overview. In box 130, the user signals the system to enter one of the workspaces. Then, in box 132, the overview display objects are removed from the display and, in box 134, the system enters the selected workspace. As discussed below, it is possible to exit the overview in this manner because the overview display may be kept current in response to every user signal.

5. Display Object Transfer and Workspace Inclusions. Another aspect of the invention is based on the recognition that the user often needs to move, copy or otherwise transfer a display object from one workspace to another. Conventional techniques of transferring display objects rely on simultaneous display of the source and destination of a transfer operation so that the user can indicate both, but two workspaces are not typically displayed simultaneously. Furthermore, since each display object is a result of the presentation of its contents in accordance with a given placement and since that placement is linked to a given workspace, it is not really possible to transfer a display object from one workspace to another. This aspect of the invention is based on the discovery of a number of techniques which permit the apparent transfer of display objects between workspaces.

Some techniques for the apparent transfer of display objects between workspaces involve the creation of a new placement linking the same display system object to the transferee workspace. For example, any pictogram in overview 100 may be selected and then moved or copied to another workspace. The move or copy operation includes creating a new placement linking that display object to the transferee workspace and including the same display characteristics as the existing placement linking it to the transferor workspace. Additionally, in a move operation, the existing placement is also deleted. The pictograms are then changed in accordance with the changed placements, resulting in a new display object in the transferee workspace which has the same display characteristics as the display object in the transferor workspace. Therefore, it appears to the user that the display object has been moved or copied.

FIG. 5 also illustrates another technique according to the invention for the apparent transfer of display objects between workspaces. Pictogram 102, labeled "CONTROL", includes window pictogram 104 and a number of other pictograms, each representing a window or other display object. Pictogram 102 represents a special workspace, referred to as a control panel, which includes a number of display objects which are useful in many other workspaces. Control panel boundary 116, which may itself be a window, provides a visual cue identifying the control panel workspace. As shown in FIG. 5, boundary 116 and the other display objects in pictogram 102 appear in nearly all the other currently existing workspaces. This result is obtained by actually including the control panel workspace in the other workspaces in accordance with the invention, so that the switch from a first workspace which includes the control panel to a second appears to transfer each of the display objects in the control panel from the first workspace to the second. Because the control panel workspace represented by pictogram 102 is included in other workspaces, it can also be used to transfer display objects into the workspaces which include it. In other words, any display object which is transferred into the control panel will simultaneously be transferred into each of the workspaces which includes the control panel.

A workspace may be invisible even when displayed, so that a workspace may include several other workspaces as long as their display objects do not conflict, either with display objects of other included workspaces or with display objects of the including workspace. A conflict could occur, for example, if two or more of the workspaces include placements linking them to the same display system object, in which case one placement might clobber the other one, preventing it from presenting a display object. Some means should be provided to resolve any such conflicts and to avoid a cyclic relation in which two workspaces include each other. Other than that, few constraints on the inclusion of workspaces within workspaces are necessary.

Figure 8:
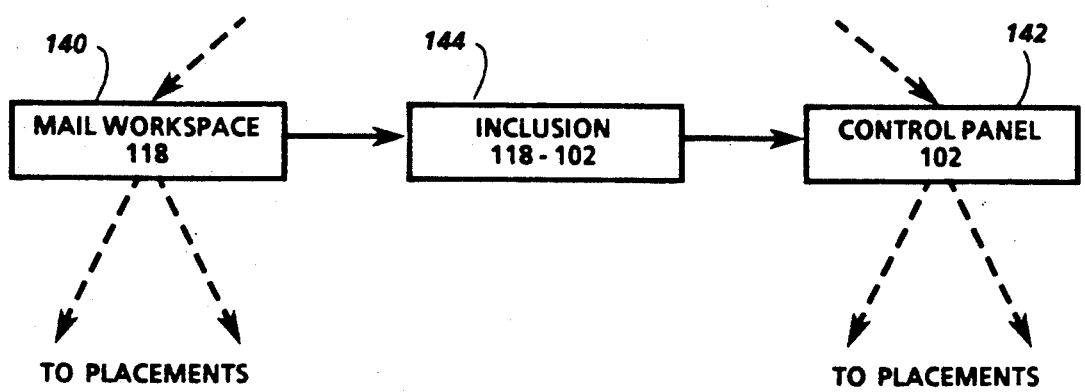
FIG. 8 is a schematic diagram showing an inclusion linking two workspace data structures.

FIG. 8 illustrates schematically the features of the data structure which permit inclusion of one workspace within another. Workspace data structure 140 includes the information necessary to generate the mail workspace, represented by pictogram 118 in FIG. 5. Workspace data structure 142 similarly includes the information for the control panel, represented by pictogram 102. Inclusion 144 is a workspace inclusion data structure which links data structures 140 and 142 so that the control panel is included in the mail workspace display. This means that boundary 116, the window represented by pictogram 104 and the other display objects represented in pictogram 102 are included in the mail workspace display, and they all appear at the same position and size as in the control panel.

Rather than being included in a subset of the other workspaces, a workspace could be included in all the other workspaces, in which case that workspace could be thought of as the user's pockets, a workspace which goes with the user into any other workspace. The display objects included in the pockets are displayed at the same position and size in every workspace. The user can use a special sequence of user inputs to transfer a display object into or out of the pockets without going to the overview. When the user invokes an operation transferring a display object into or out of the pockets, the system creates or deletes the placement linking the corresponding display system object to the pockets workspace. As discussed below, the technique for including the pockets in the other workspaces may differ from the inclusion technique shown in FIG. 8, and may make use of the workspace leaving step in box 66 in FIG. 3 and the workspace entry step in box 82 in FIG. 4.

Another technique for transferring display objects from one workspace to another also makes use of the steps in boxes 66 and 82. As described above, those steps involve operations performed whenever the user leaves or enters a given workspace. If the user provides a sequence of signals indicating that display objects are to be moved or copied from the workspace being left into the workspace being entered, the user is given an opportunity to designate which display objects are to be moved or copied, such display objects being referred to as "baggage". If a display object is being moved or copied, the procedures in box 66 include creating a new placement to link the corresponding display system object to the workspace being entered, after which the placement linking it to the previous workspace is deleted if the display object is being moved. Then, the procedures in box 82 include linking the new placements to the workspace being entered so that the display objects in the baggage are displayed at the same position and size as in the previous workspace.

6. Workspace Manipulation. Another aspect of the invention is based on the recognition that the user must be able to create, delete and otherwise modify workspaces and modify their contents. The invention includes a number of techniques for solving this problem. Some of those techniques use the overview, in which a display object can be deleted from one workspace or from all workspaces containing it, and in which an entire workspace can be deleted or copied. In addition, the user can edit a description of a workspace from the overview or within the workspace with an appropriate sequence of signals. This aspect of the invention is further based on the discovery of techniques which permit treatment of a group or suite of workspaces as a distinct data structure. This suite of workspaces can be made available to other users, as by storing it on a server, and another user can then add it to an existing set of workspaces through a process called augmenting.

Figure 9:
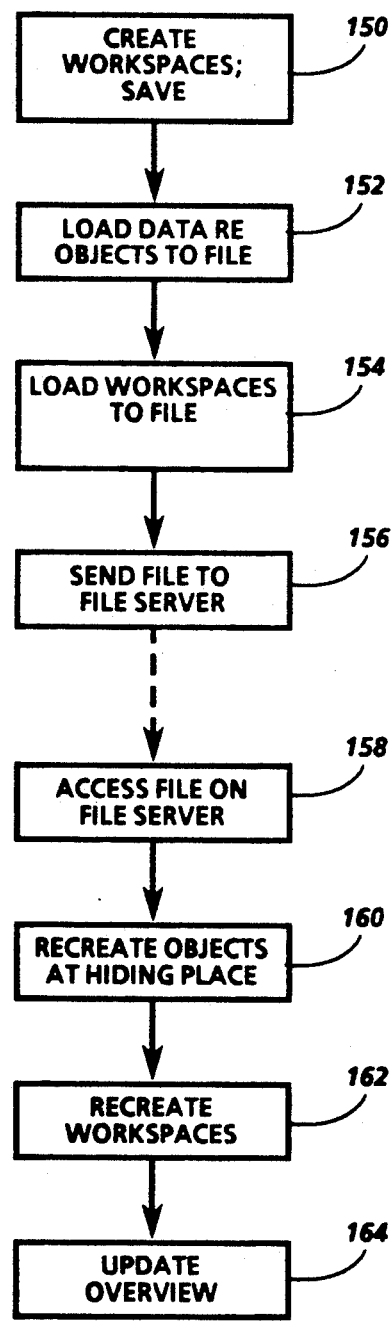
FIG. 9 is a flowchart showing steps for file operations on workspace data structures.

FIG. 9 shows a sequence of steps implementing these techniques. In box 150, an expert or other user creates a suite of workspaces which are useful for a set of tasks. These workspaces may be suitable, for example, for a novice user of workspaces who needs a basic set of workspaces. Or the workspaces could be suitable for a specialist in a given field who needed a set of workspaces for certain specialized tasks. The creator then invokes a save operation on the suite of workspaces through an appropriate sequence of signals.

The save operation includes loading data relating to display system objects into a file, in box 152. The display system objects for which data is loaded are those which correspond to display objects in the suite of workspaces being saved, and the data loaded about each display system object will depend on the type of the display system object, as discussed in more detail below. Next, the data structures of the workspaces themselves are loaded, in box 154. The data structure of each workspace is modified so that references to display system objects refer to the display system object as stored in the file, not as it existed in the display system. When the file has been loaded in this manner, it is sent to a file server or other appropriate storage medium in box 156.

The file may remain on the file server for an indeterminate length of time, as indicated by the dashed line after box 156. Then, at some point, a user accesses it, in box 158. The user invokes an operation which recreates the contents of the file. In box 160, the display system objects are recreated on the display system, and are directed to provide the corresponding display objects to the hiding place, so that those display objects are not displayed. Then, in box 162, the workspaces themselves are recreated, and the handles of the recreated display system objects in the display system are inserted into the workspace data structures. The user will typically access the file from the overview, so that the overview is updated in box 164, permitting the user to enter one of the newly added workspaces or perform overview operations.

The technique of FIG. 9 can be used for a number of purposes, including application delivery. As described in greater detail below, another aspect of the invention is to provide a user interface for that purpose.

The various aspects of the invention may be implemented in numerous ways. We will first examine data structures which provide workspaces, and from that continue to leaving and entering a workspace and other procedures; the overview; and saving, restoring and augmenting suites of workspaces.

C. Data Structures

As described above, one aspect of the invention involves implementing workspaces with a preexisting display system such as a conventional window system. It would also be possible, of course, to implement the invention by creating an entirely new display system. The following description focuses on that part of the data structure which must be added to an underlying window system, whether conventional or specially created, in order to implement the invention.

Figure 10:
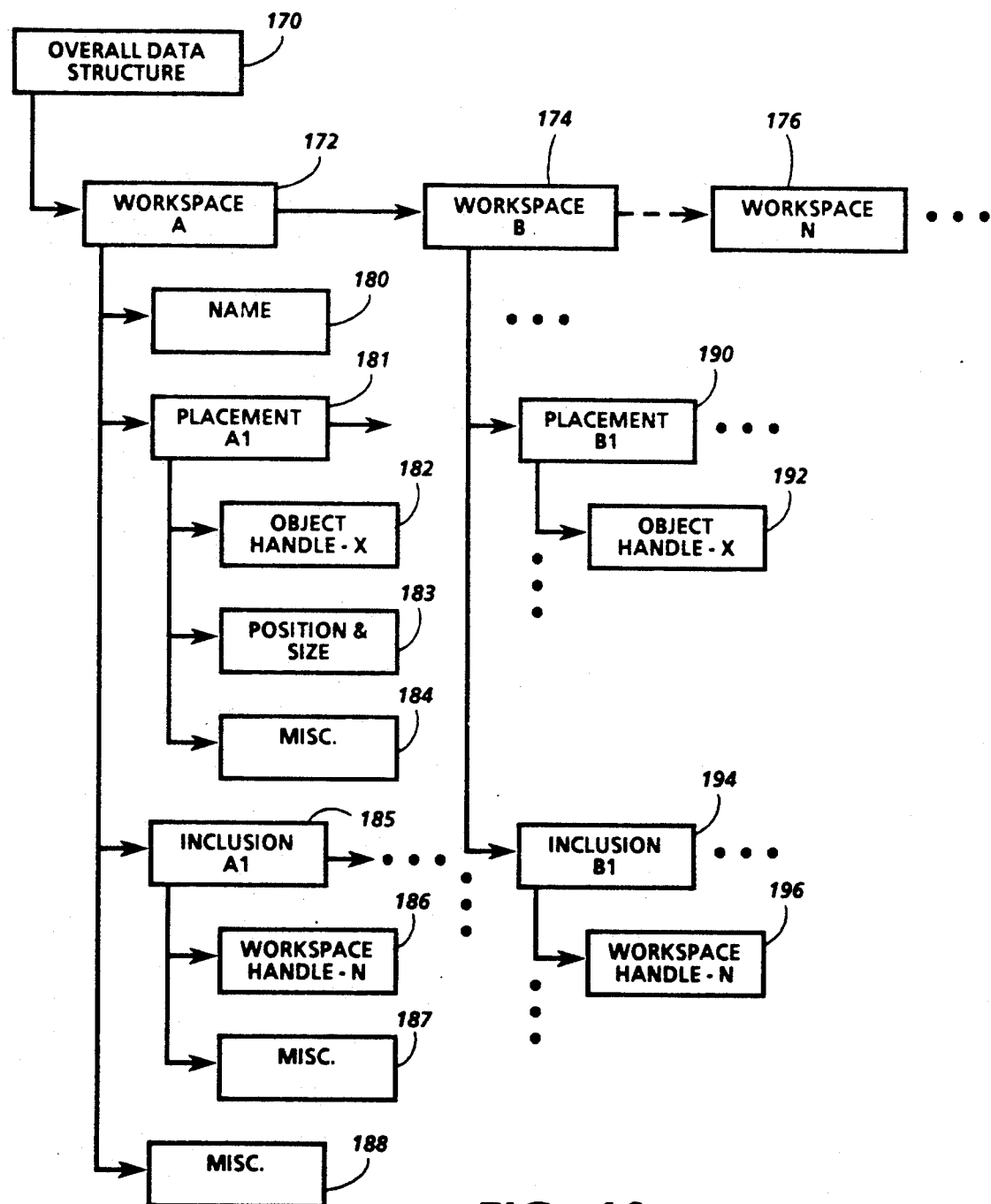
FIG. 10 is a schematic diagram showing an overall workspace data structure.

FIGS. 2 and 8, discussed above, show schematic data structures which include workspace data structures, placements and inclusions. FIG. 10 shows an illustrative overall data structure 170 which illustrates these features according to one implementation of the invention. In FIG. 10, subsidiary data structures are shown to the right of a line extending downward from the data structure which includes them. Overall data structure 170 thus includes subsidiary data structures 172, 174 and 176 for workspace A, workspace B, and workspace N, respectively, as well as others not shown.

Workspace data structure 172 for workspace A is shown in more detail than the other workspace data structures, although each workspace data structure includes the same basic data components. Name 180 is the name of the workspace which is used in creating the overview, as shown in FIG. 5, and which may also serve as the workspace handle for accessing the workspace data structure.

Each workspace data structure may include one or more placements, an example being placement 181, designated placement A1 because it is the first placement in the data structure of workspace A. Placement 181 itself includes several data components, including display system object handle 182 which can be used to access the corresponding display system object and which therefore links it to placement 181 and hence to workspace data structure 172. Handle 182 could be a name or number or any other unique identifier of the corresponding display system object or it could be the entire display system object itself. If an identifier, the handle can be provided to the display system for access, and a command provided with the handle will determine the manner in which the display system object responds. Placement 181 also includes position and size data 183 which defines the position and size of the corresponding display object and which therefore indicates the spatial display relationship of that display object to other display objects corresponding to other placements.

Placement 181 includes miscellaneous data components 184 which define other display characteristics of the display object. For example, miscellaneous data components 184 may include information about the drop shadow, such as its width and darkness, and an indication of whether the display object is in shrunken form, such as an icon, and, if so, the position of the icon. If a display object may be made to disappear and come back onto the display or if it can include features which move or are stationary, appropriate data to indicate its present state can be included in miscellaneous data components 184.

Each workspace data structure may also include one or more inclusions, an example being inclusion 185, designated inclusion A1 because it is the first inclusion in the data structure of workspace A. Inclusion 185 itself includes a number of data components, including workspace handle 186 and miscellaneous data components 187. Workspace handle 186 is used to access the included workspace, and may be the workspace's name or a pointer to the workspace data structure. Miscellaneous data components 187 for an inclusion define other display characteristics of the included workspace. For example, data may be included indicating whether the included workspace's background appears in the workspace which includes it and indicating whether the included workspace is offset in relation to the workspace which includes it, so that the display objects it includes may not appear in the same position in each of the workspaces which include that workspace.

Each workspace data structure also includes miscellaneous data components 188, such as background specifications and procedures to be performed in leaving and entering that workspace. In general, miscellaneous data components 188 define all the other variable features of the workspace. Some of these features are used to distinguish that workspace from other workspaces, such as the background; others may provide procedures or data useful during task switching, such as the position at which a back door to the previous workspace will be displayed. Some of these components are discussed below in relation to Table I.

FIG. 10 also shows a few of the data components in workspace data structure 174 for workspace B, illustrating two ways in which workspaces may share a tool. Placement 190, designated placement B1, includes display system object handle 192. As shown, handle 192 has the value X, the same value as handle 182 in placement 181 in workspace data structure 172. Therefore, placements A1 and B1 link the same display system object to workspaces A and B, respectively. The display characteristics of the tool provided by the display system object may be different in the two workspaces, but it will be available in both. Similarly, inclusion 194, designated inclusion B1, includes workspace handle 196. As shown, workspace handle 196 has the value N, the same value as workspace handle 186 in inclusion 185. Therefore, inclusions A1 and B1 include the workspace N in workspaces A and B, respectively. The display characteristics of the display objects in workspace N will generally be the same when they are presented in workspaces A and B.

TABLE I

```
(WS.WORKSPACEA  (BACKGROUND  (FRAME      (SHADE <shade>)
                                         (FRAME.WIDTH <width>))
                             (TEXT       (STRING "SPACE A")
                                         (FONT <font>)
                                         (POSITION <x, y,>)
                                         (DROP.SHADOW
                                          <boolean>)))
                ((PLACEMENT  (OBJECTX  (POSITION <x, y>, SIZE <h, w>)
                                       (DROP.SHADOW.DATA <width, darkness>)
                                       (SHRINKING.DATA <boolean, location>))
                 (PLACEMENT  (OBJECTY  (POSITION <x, y>, SIZE <h, w>)
                (INCLUSIONN)
                (INCLUSIONP)
                (PROPERTIES <functions>))
WS.WORKSPACEB   (BACKGROUND             (TEXT       (STRING "SPACE B")
                                                    (FONT <font>)
                                                    (POSITION <x, y>)
                                                    (DROP.SHADOW
                                                     <boolean>)))
                ((PLACEMENT  (OBJECTX  (POSITION <x, y>, SIZE <h, w>)
                                       (DROP.SHADOW.DATA <width, darkness>)
                                       [SHRINKING.DATA <boolean, location>))
                 (PLACEMENT  (OBJECTZ  (POSITION <x, y>, SIZE <h, w>)
                (INCLUSIONN)
                (INCLUSIONQ)
                (PROPERTIES <functions>))
(WS.WORKSPACEN  (IF          (TEXT       (STRING "SPACE N")
                                         (FONT <font>)
                                         (POSITION <x, y>)
                                         (DROP.SHADOW
                                          <boolean>)))
                ((PLACEMENT  (OBJECTV  (POSITION <x, y>, SIZE <h, w>)
                                       (DROP.SHADOW.DATA <width, darkness>)
                                       (SHRINKING.DATA <boolean, location>))
                (PROPERTIES <functions>))
```

Table I shows in text form a pseudo-code data structure corresponding to overall data structure 170 in FIG. 10. The data structure in Table I includes three workspace data structures, each beginning with "WS.WORKSPACE" followed by the name of the workspace, A, B or N. After the name is the background specification, part of the miscellaneous data concerning the display characteristics of the workspace. The background of workspace A includes a frame, which has a specified shade and width. It also has the title "Space A" with a specified font, position and drop shadow. The background of workspace B has a title but no frame. The background specification of workspace N is preceded by the conditional "IF" meaning that it has a title only when it is displayed on its own and not when displayed as an included workspace.

After the background specification of each workspace appear its placements, each with the handle of a display system object and the display characteristics of the corresponding display object within that workspace. The display characteristics include the position and size of the display object, each of which may be specified with a pair of numbers, position by the left and bottom coordinates and size by the width and height. Then follow the drop shadow data and shrinking data, if any, which may include the left and bottom coordinates of the shrunken form of the display object.

After the placements are the inclusions, each including a workspace handle. Then follow the properties, which may be miscellaneous procedures to be called upon entering or leaving the workspace, and which may be included in the procedures in box 66 in FIG. 3 and box 82 in FIG. 4.

Some of the display presentation characteristics in overall data structure 170 in FIG. 10 correspond to data in display system objects in the underlying display system. For example, position and size data 183 and miscellaneous data components 184 ordinarily correspond to data used by object X to provide its display object when workspace A is displayed. Because these display presentation characteristics are included in the placements, they can be different for each workspace which has a placement linking to object X. The data in the object itself may be changed or lost, however, if it presents a display object with different display characteristics in another workspace, depending on the display system's operations. As discussed below, the display presentation characteristics are provided to the object from the placement which links that object to a workspace being entered, with the result that the object presents a display object in accordance with its placement, not with its previous presentation.

The simplicity of overall data structure 170, as shown in FIG. 10 and Table I, makes it easy for a user to edit each workspace data structure and permits compact storage of a suite of workspaces, features of the invention discussed below. As we will now see, however, this simplicity conceals a number of relatively complicated procedures which are part of this implementation of the invention.

D. Procedures

As described above, the invention solves a number of user interface problems, several of which relate to task switching. Therefore, procedures are necessary to set up an underlying display system for task switching and also to perform task switching when requested by the user.

Figure 11:
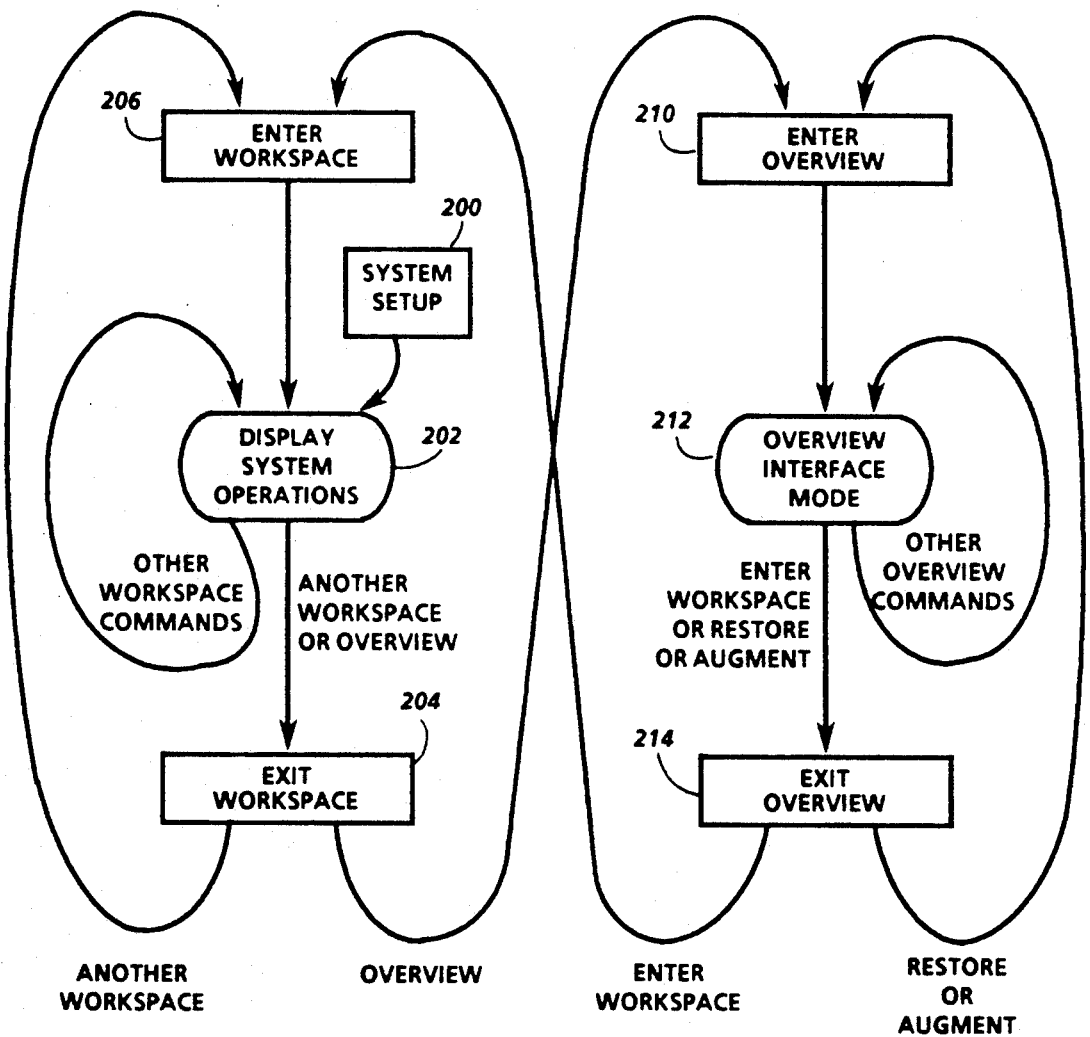
FIG. 11 is a state and transition diagram showing procedures and modes of a workspace system.

FIG. 11 shows how the relevant states (shown as ellipses) and procedures (shown as rectangles) of one implementation may be analyzed, with the transitions between the states and procedures resulting from user commands relating to task switching. Initially, the system setup procedure 200 prepares the system to display an initial workspace and to perform task switching when requested. Upon completion, the system goes through a transition to its underlying display system operation 202, in which the system responds to a wide variety of user commands. But when the user provides a command requesting that another workspace or the overview be displayed, the system performs an exit workspace procedure 204 to exit the currently displayed workspace. Then, if the user request is for another workspace, the system performs an enter workspace procedure 206 to display the requested workspace, after which it returns to display system operations 202.

The description in this section focuses on system setup 200, exit workspace 204 and enter workspace 206. FIG. 11 also shows, however, several procedures which will be discussed in the next section in relation to the overview, through which the user can obtain information to assist in task switching. After exit workspace procedure 204, if the user requested the overview, enter overview procedure 210 is performed, resulting in an overview display, an example of which was described above in relation to FIG. 5. Then the system enters overview interface mode 212, in which the system responds to various user commands related to the overview. When the user provides a command to enter a workspace or to restore or augment with a suite of workspaces from a file, the system performs exit overview procedure 214. If entering a workspace, the system then performs enter workspace procedure 206 to display the requested workspace. It then returns to display system operations 202. But if restoring or augmenting, the system performs enter overview procedure 210 and then returns to overview interface mode 212.

We now consider in more detail some of the procedures in FIG. 11.

1. System Setup. A central objective of system setup procedure 200 is to permit rapid, effective task switching by the user once the system is set up. A small number of signals from the user should suffice to invoke a task switch, and once invoked, the task switch should be performed rapidly. But between task switches, display system operation 202 should continue in its usual fashion, displaying the current workspace.

Figure 12:
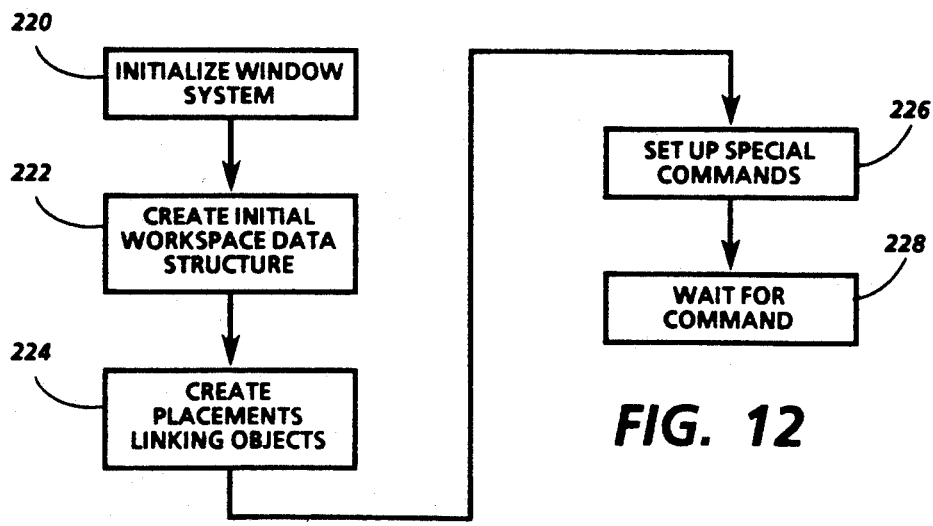
FIG. 12 is a flowchart showing steps for the system setuo procedure of FIG. 11.

FIG. 12 shows a technique for setting up an underlying window system for workspace operations, including workspace display and task switching. Prior to setup, the window system will include some combination of existing display system objects, each providing a window, and the step in box 220 initializes the window system in preparation for beginning workspace operations. This step may involve creating additional display system objects or modifying existing objects to support workspace operations. It may also involve modifying the window management software to include procedures for responding to commands from the workspace system. For example, if a user invokes a workspace system procedure which provides the handle of a display system object and a command indicating an operation to be performed in relation to that display system object, the window system would execute such a procedure to perform the operation and return the results to the workspace system procedure.

The steps in boxes 222 and 224 together create an overall data structure which the user can modify during subsequent operations to include the workspaces appropriate to the tasks being performed. In box 222, the setup procedure creates a data structure for an initial workspace which will be displayed when display system operation 202 begins. This initial workspace's data structure will have default values for its background and properties, and will begin with no placements or inclusions. In box 224, the setup procedure creates a placement for each of the existing display objects, linking the corresponding display system object to the initial workspace's data structure.

The final steps in FIG. 12 prepare the system to receive the relevant user commands. The window system's user interface will include some mechanism for receiving user commands, and the step in box 226 adds special commands relating to task switching to that mechanism. For example, if the window system has a background menu which the user can view by selecting a location in the display background, special commands can be added to the background menu. The menu may include a command which, when selected, provides a submenu enabling the user to select any existing workspace or to select the creation of a new workspace. The menu may also include an "Overview" command which, when selected in one way, leads to entering the overview, but when selected in another way, enables the user to pick a display object up and put it in the pockets or to put down a display object which was previously in the pockets.

When the special commands have been set up in box 226, the system continues to display system operation 202, with further workspace operations occurring only when a user command requesting such operations is received. We turn now to examine exit workspace procedure 204, a workspace operation by which the user may leave the initial workspace or any other workspace.

2. Exit Workspace. A user may invoke exit workspace procedure 204 in several ways, but the procedure is substantially the same regardless of how invoked, and follows the general sequence described above in relation to FIG. 3. One of its purposes is to update the current workspace's data structure so that the next time the user enters the workspace being exited, it will appear much the same as when exited. This purpose is served by storing data in placements, as described above in relation to box 62 in FIG. 3.

A number of steps are taken in updating the workspace data structure: If a new window or other display object has been created, a placement is created linking the underlying display system object to the current workspace. If a window in the currently displayed workspace has been deleted, the placement which linked the corresponding display system object to that workspace is deleted. The display characteristics in the placement of each displayed window are updated, and the placements are reordered according to their stacking in the current display.

Inclusions present some special problems in updating the workspace data structure. Even though a window in an included workspace has been deleted from the display, it may be inappropriate to delete it from the included workspace, because it may be needed in other workspaces which include that workspace. Similarly, if a window is in the currently displayed workspace and in one of its included workspaces or if a window is in more than one of the included workspaces, the only placement which should be updated is the one corresponding to the window as actually displayed. As will be seen below, one way of resolving these problems is to delete placements only from the currently displayed workspace and to update only one placement for a given application, the one responsible for the display object in the current workspace.

Figure 13:
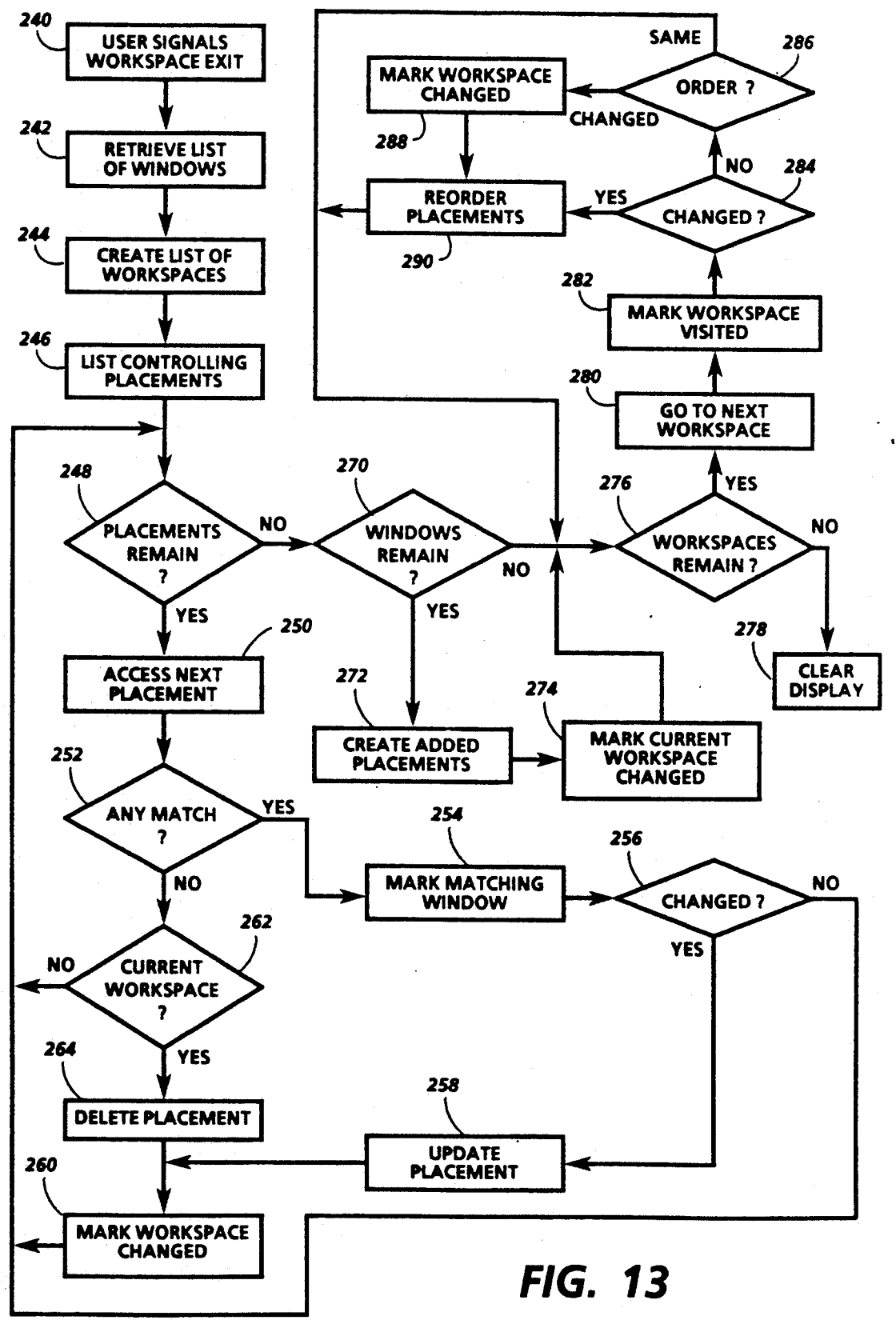
FIG. 13 is a flowchart showing steps for the exit workspace procedure of FIG. 11.

FIG. 13 illustrates general steps of a procedure for exiting a workspace. The procedure of FIG. 13 begins when the user signals for an exit from the currently displayed workspace, in box 240. A number of signal sequences indicating an exit from the currently displayed workspace are described below in relation to FIG. 14, together with related preliminary steps.

The workspace exit procedure requires certain information from the display system. In box 242, the procedure retrieves the current list of displayed windows to assist in updating the placements. At the same time, the procedure may retrieve other data it requires, including the handle of the currently displayed workspace, which it will use to access that workspace's data structure. Then, in box 244, it creates a list of displayed workspaces, including the current workspace and the workspaces included in it, as described below in relation to FIGS. 15A and 15B. Then, it uses the list of workspaces and the list of windows to create a list of placements which control currently displayed windows, in box 246, as described below in relation to FIG. 16. The controlling placements are then examined to determine which placements require updating.

The test in box 248 begins this process by determining whether any of the controlling placements remain to be examined. If so, the next unexamined placement is accessed in box 250. The placement lest contains sufficient data to access the placement, and may, for example, include the handle of the display system object and the handle or other identifier of the workspace. The placement may then be accessed by accessing that workspace's data structure and finding a placement with a matching object handle.

Once the placement has been accessed, it is compared with the handles of the currently displayed windows in the list, in box 252. If it matches one of the windows, that window is marked as having been matched in box 254. Since the placement is one of the controlling placements, this must be the window it controls. Then, in box 256, the contents of the placement are compared with the current display characteristics of the window to determine whether any changes have occurred since the workspace was entered. If so, the placement is updated in box 258 to reflect the changes and the workspace which contains that placement is marked in box 260 to indicate that its contents are changed, so that its pictogram in the overview must be modified next time the overview is entered. Since the overview display, as shown in FIG. 5, requires a substantial amount of computation, it is advantageous to cache the overview contents during those periods of time when it is not displayed. It is also advantageous to recompute the pictogram of a workspace only when necessary, since recomputing a workspace's pictogram involves recomputing the pictograms of all the workspaces which include it. Therefore, a workspace's pictogram is recomputed only when the workspace is marked changed. The workspace may be marked changed by inserting an indication in the overview cache that the workspace's pictogram must be recreated next time the overview is entered. After completing this step, the procedure returns to the test in box 248 to determine whether unexamined controlling placements remain.

If, on the other hand, the test in box 252 determines that the controlling placement being examined does not match any of the currently displayed windows, the display object corresponding to that placement must have been deleted since the current workspace was entered. The test in box 262 determines whether the placement which does not match is in the currently displayed workspace, in which case that placement is deleted in box 264. If the placement is not in the currently displayed workspace, it must be in one of its included workspaces, in which case the placement is not deleted, on the theory that the user probably did not intend to delete a window from the other workspaces which might contain it. If a placement was deleted, the current workspace is marked changed in box 260, as above, before returning to the test in box 248 for further placements to be examined.

When all the controlling placements have been examined, the test in box 270 determines whether the window list contains any unmatched windows. If so, those windows have been created since the current workspace was entered, and placements do not yet exist for them. The step in box 272 creates a placement linking the underlying display system object of each unmatched window to the current workspace, and including the display presentation characteristics of that window as currently displayed. The current workspace is them marked changed in box 274.

Figure 17:
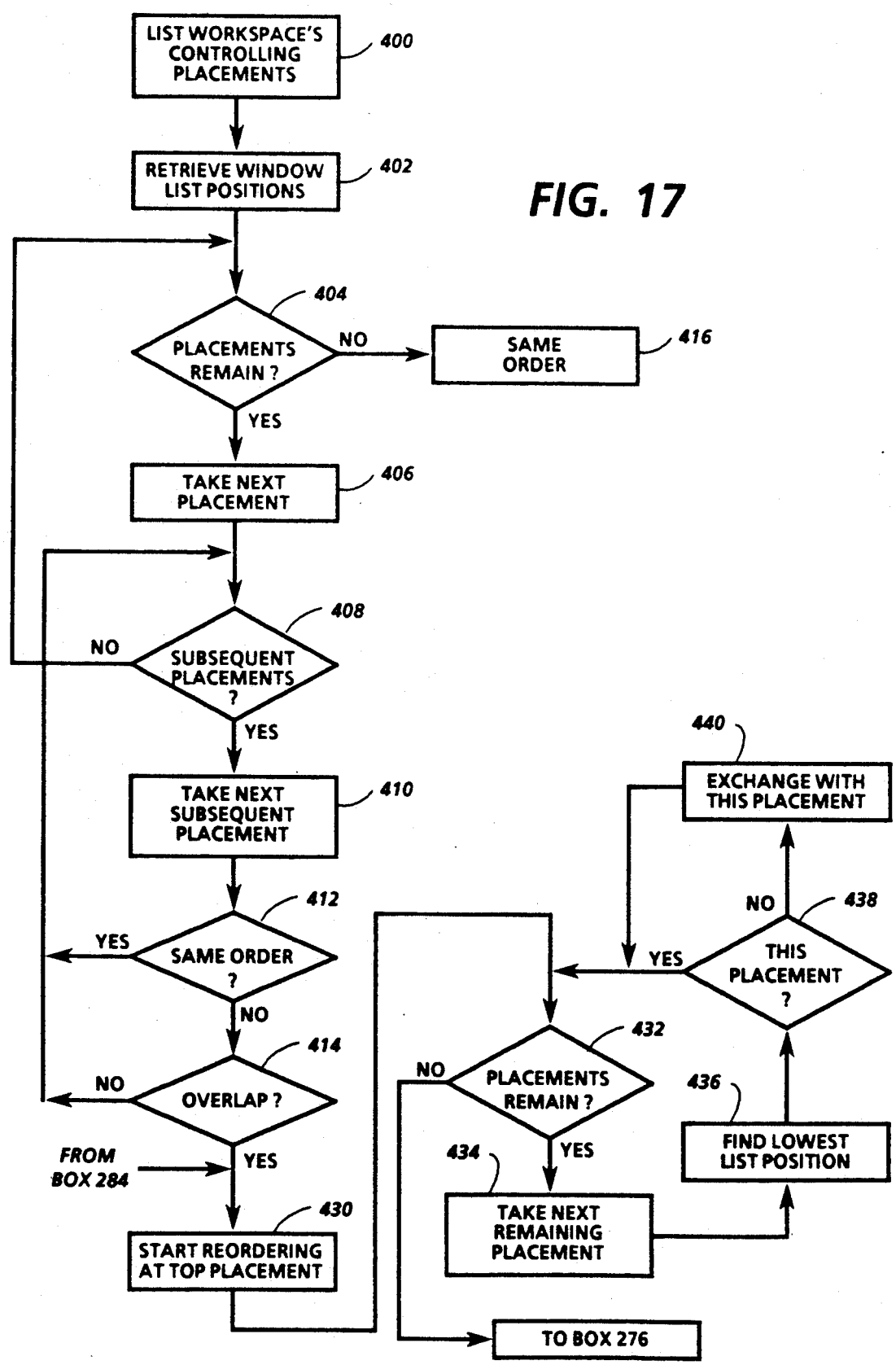
FIG. 17 is a flowchart showing steps for testing the order of placements and for reordering placements in a workspace in FIG. 13.

At this point the procedure begins to go through the workspaces on the workspace list to reorder the placements if necessary. The test in box 276 determines whether unvisited workspaces remain on the list to be examined and, if not, the step in box 278 proceeds to clear the display by moving all the current display objects to the hiding place. If, on the other hand, workspaces remain to be visited, the next workspace is accessed in box 280 and marked visited in box 282. The test in box 284 determines whether that workspace has already been marked changed, in which case it is necessary to reorder its placements. If not, the test in box 286 determines whether it is necessary to reorder the placements anyway because the order has changed, as described below in relation to FIG. 17. If the order has changed, the current workspace is marked changed in the overview cache, in box 288. The placements are then reordered, in box 290, one technique for which is also shown in FIG. 17. When any necessary reordering of this workspace is completed, the procedure returns to repeat the test in box 276.

As noted above, when all workspaces have been visited, the display is cleared in box 278. This may be done by giving a command which causes the window system to change each display system object so that all the display objects are made invisible, as by providing them to the hiding place. Another step taken at this time or earlier is to store a value indicating that the workspace being exited is the previous workspace. Other procedures which are part of workspace leaving procedures 66 in FIG. 3 are discussed in more detail below.

Figure 14:
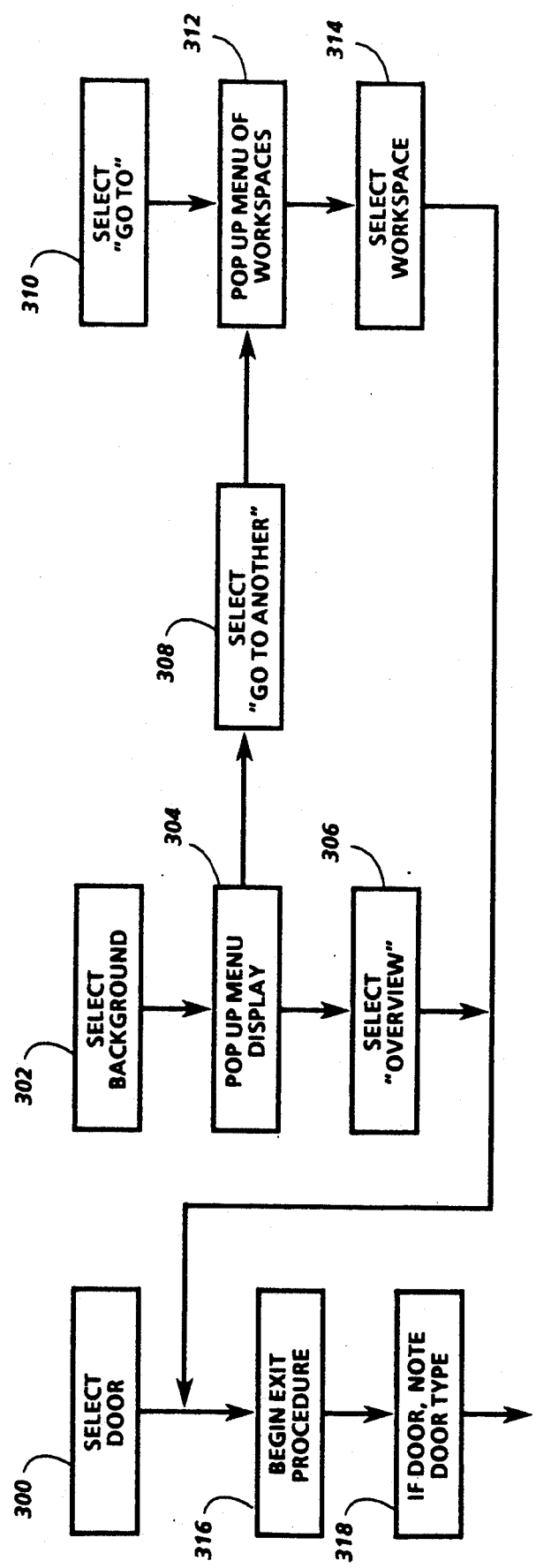
FIG. 14 is a flowchart showing a number of user signal sequences by which a user may signal a workspace exit in FIG. 13.

FIG. 14 shows exemplary signal sequences by which the user may signal a workspace exit, corresponding to box 240 in FIG. 13. The simplest is to select a door or back door, in box 300. Other sequences begin in box 302 with the selection of the background of the currently displayed workspace, in which case the window system displays a pop up menu in box 304. The user may then select the "Overview" command on the pop up menu, in box 306. The user may also select the "Go to Another Workspace" command, in box 308 or may select a special type of door labeled "Go To", in box 310; in either case, the system displays a pop up menu with the names of all existing workspaces and other options in box 312, and the user may select a workspace to enter in box 314. All these sequences of user signals take place within the window system, but each leads to a command which begins exit workspace procedure 204, in box 316. The sequence of signals which invokes the exit workspace procedure may involve certain data which is stored at the beginning of the procedure. FIG. 14 shows an example in box 318, with the procedure noting the type of door, whether an ordinary door or a back door, to determine whether it is necessary to add a back door to the next workspace entered. Similarly, the procedure would store the name or handle of the next workspace to be entered if the sequence of signals indicated that another workspace should be entered.

Figure 15A:
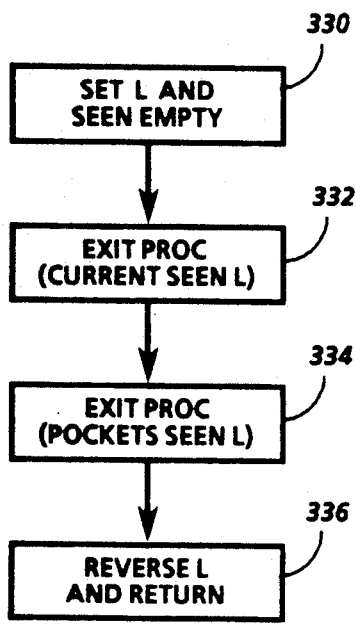
FIG. 15A is a flowchart showing steps for a routine for creating a list of workspaces in FIG. 13.
Figure 15B:
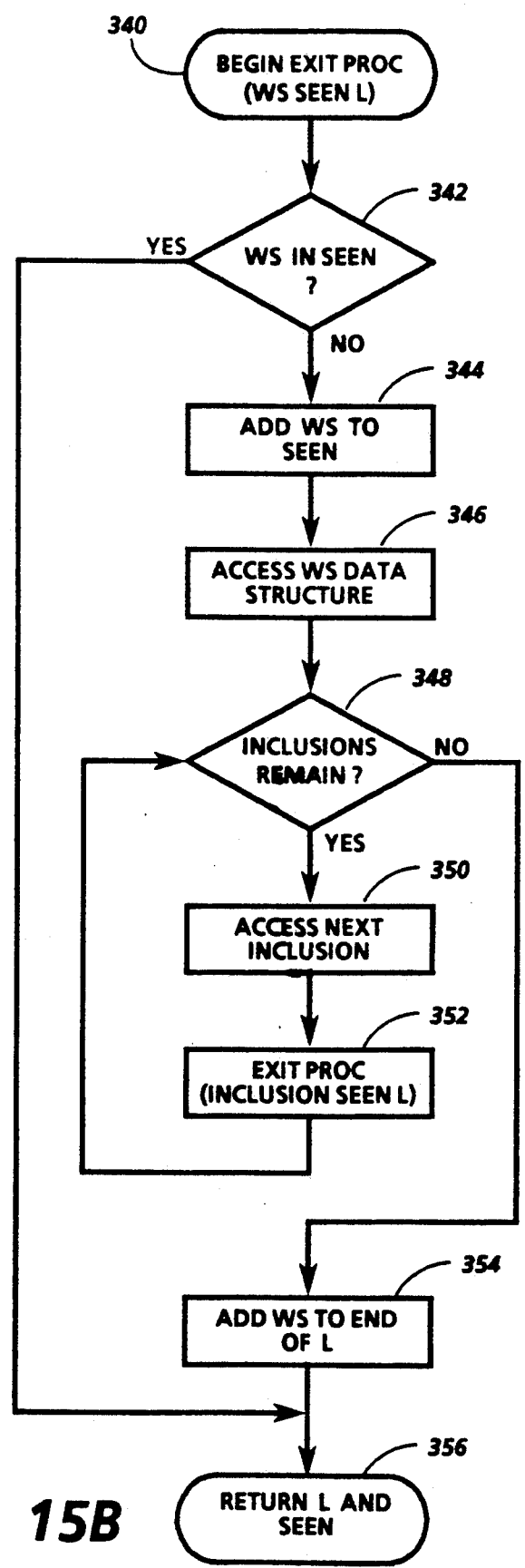
FIG. 15B is a flowchart showing steps of a recursive procedure called in FIG. 15A.

FIGS. 15A and 15B show a routine for creating a list of workspaces in box 244 in FIG. 13. This list and the placement list created in box 246 provide the information with which the routine of FIG. 13 accesses the actual placements and workspace data structures in the process of updating and reordering the placements. These lists could be created in a multitude of ways, but the routine in FIGS. 15A and 15B orders the workspaces such that the list of controlling placements created by the routine of FIG. 16 can be more easily created. The routines of FIGS. 15A, 15B and 16 rely on the ordering of the placements and inclusions within each workspace's data structure. It is assumed that the placements are ordered in the order in which the corresponding window is moved from the hiding place to the display, so that the last placement in each workspace corresponds to the topmost window in that workspace. The inclusions are similarly ordered in the order in which their placements are moved to the display, so that the last inclusion in each workspace corresponds to the topmost inclusion. The ordering of either the placements or the inclusions or both could be reversed without significantly changing the routines of FIGS. 15A, 15B and 16.

The main routine of FIG. 15A creates a list in which the workspaces are listed in the reverse order in which their placements are moved to the display, or from top to bottom. The step in box 330 sets up and initializes two lists, one the L list and the other the Seen list. The step in box 332 calls a recursive procedure ExitProc and provides the handle of the current workspace as well as the Seen and L lists. Upon receiving these lists back, the step in box 334 again calls ExitProc, this time providing the handle of the pockets room and the lists. Upon receiving the L list back, the step in box 336 reverses the order of the workspaces in the L list and returns the reversed list, which will have the pockets room as its first member.

ExitProc, as shown in FIG. 15B, begins with a call in box 340 which includes the handle of a workspace, WS, as well as the Seen and L lists. The test in box 342 determines whether WS is in the Seen list. If not, WS has not yet been processed. The step in box 344 adds WS to the Seen list and the step in box 346 uses WS to access that workspace's data structure. The test in box 348 determines whether inclusions remain to be examined in the data structure. If so, the next inclusion is accessed in box 350 and its handle is provided in a recursive call of ExitProc. When the test in box 348 determines that all the inclusions in WS have been examined, WS is added to the end of the L list in box 354 and the L and Seen lists are returned in box 356. The L and Seen lists would have been returned immediately had the test in box 342 determined that WS was in the Seen list.

The workspace list created by the routine of FIGS. 15A and 15B, in addition to keeping the pockets at the top of the list, takes care of some potential problems. If two workspaces include each other, the routine will not cycle, but will take only one instance of each workspace, the instance responsible for displaying the placements in that workspace. Also, if a given workspace is included in more than one of the other workspaces included in the current workspace, only one instance of that workspace will be on the list, again the instance responsible for displaying the placements in that workspace. Because these problems are avoided, the preparation of the controlling placement list is simplified.

Figure 16:
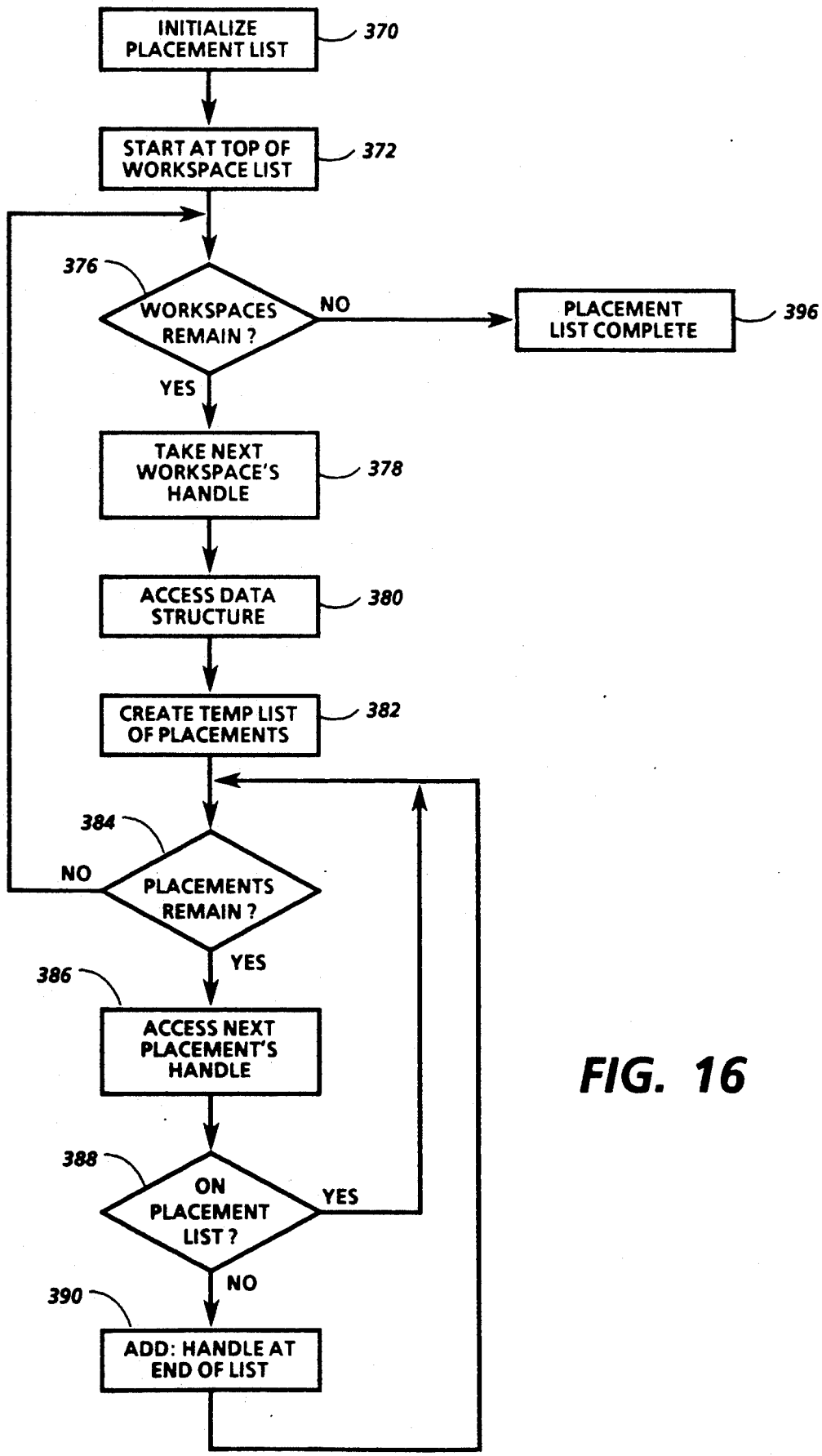
FIG. 16 is a flowchart showing steps for creating a list of controlling placements in FIG. 13.

The routine of FIG. 16 creates a list of controlling placements as of the time the current workspace was entered. It begins by creating and initializing the placement list in box 370. The routine then goes to the top workspace on the workspace list or L list created by the routine of FIGS. 15A and 15B, in box 372, and proceeds toward the beginning of that list in subsequent operations. As noted above, if a pockets room exists, it will be the top workspace.

The test in box 376 determines whether the routine has reached the bottom workspace on the list. If not, workspaces remain to be examined, and the routine takes the next workspace's handle from the list in box 378 and uses it to access that workspace's data structure in box 380. The routine retrieves the handles from the placements in box 382 and creates a temporary list, TempList, listing the placements in reverse order. The test in box 384 determines whether any placements on TempList remain to be examined. If so, the handle in the next unexamined placement is accessed in box 386 and compared with the handles already on the list by the test in box 388. If the handle is not yet on the list, it is added at the end of the list, in box 390, and the routine routines to the test in box 384 for further placements. For purposes of subsequent routines it is useful for each entry in the controlling placement list to include the handle or other indicator of the workspace in which each placement is first found, and this can be done in box 390.

When all the placements in a workspace have been examined in this manner, the routine returns to the test of box 376. When the last workspace has been examined, the test in box 376 determines that no workspaces remain, and the placement list is complete, as indicated in box 396. The controlling placement list contains only one entry with each placement handle, and that entry indicates the handle of the workspace which includes the placement controlling the corresponding display object when the current workspace was entered. It is this placement which is subsequently updated in box 258 in FIG. 13, if necessary.

The controlling placement list created in FIG. 16 also plays a role in determining whether the placements in a given workspace are in the same order as when the current workspace was entered, in box 286 in FIG. 13. FIG. 17 shows a routine for testing whether the placement order has changed in a way necessitating the reordering of the placements in box 290.

The routine of FIG. 17 begins by creating a temporary list of the controlling placements which are in the workspace being examined, in box 400. These placements may be obtained from the controlling placement list created by the routine of FIG. 16, and should have the same order in the temporary list as they have in the controlling placement list. For each controlling placement on this temporary list, the routine retrieves the position of the corresponding window on the window list, in box 402. This can be done by finding the window list entry with a matching handle.

The routine then proceeds through the temporary list, with the test in box 404 determining whether any placements remain to be examined. If so, the next unexamined placement on the temporary list is taken in box 406. The test in box 408 then determines whether there are any uncompared placements after this placement. If so, the next uncompared subsequent placement is taken in box 410. The test in box 412 compares the window list positions of this uncompared placement with the placement being examined. If the position of the placement being examined is further down in the window list than that of the uncompared placement, they are not in the same order they were in when the current workspace was entered. It may not be necessary to reorder the placements, however, if the placements which are out of order do not overlap, as determined by the test in box 414. If reordering is not necessary, the test in box 408 is repeated for subsequent uncompared placements on the temporary list.

The routine continues through subsequent uncompared placements until all have been compared. Then, the routine returns to the test of box 404 to determine whether further placements remain to be examined. If not, the routine has gone through the entire list without finding it necessary to reorder, so that the result of the test in box 286 in FIG. 13 is that the placements are in the same order, as indicated in box 416.

If reordering is necessary, either because of the test in box 414 in FIG. 17 or because of the test in box 284 in FIG. 13, reordering begins with the top placement in the temporary list. If the routine comes directly from box 284, it is therefore necessary to create the temporary list as in boxes 400 and 402 before proceeding with this step. The test in box 432 determines whether placements remain on the temporary list. If so, the next remaining placement is taken in box 434, and the routine also finds the lowest list position of all the remaining placements, in box 436. If the test in box 438 determines that the placement taken in box 434 has the lowest list position, then this placement is correctly ordered. Otherwise, the placement with the lowest list position is exchanged with this placement in box 440, and the routine proceeds to the next remaining placement. When all the placements have been examined in this manner, the routine of FIG. 17 is complete.

When the routine of FIG. 13 has been completed, exit workspace procedure 204 performs any additional workspace exit procedures which are appropriate. Some of these procedures may be specific to the workspace being left, as in box 66 in FIG. 3. Each of these exit procedures is typically paired with an entry procedure in box 82 in FIG. 4, with the entry procedure setting up the system to operate in a particular manner while it is the current workspace and the exit procedure resetting the system to a neutral state in which it is ready to enter any workspace, the current workspace returning to its virtual state until it is next entered.

Some of the entry and exit procedures could, for example, determine how display objects appear within a workspace. An entry procedure could set up the workspace so that windows will be tiled in columns or will appear in fixed positions, with the paired exit procedure returning the window system to display windows in an overlapping mode. An entry procedure could change a connected directory, with the paired exit procedure restoring the previous connected directory. An entry procedure could retrieve a data structure specific to that workspace which supports particular operations in the workspace, with the paired exit procedure storing that data for subsequent retrieval during the next entry procedure in that workspace. An entry procedure could retrieve a variable to be used in the workspace, such as a handle for an input/output device such as a printer, with the paired exit procedure returning the system to a default variable.

Entry and exit procedures can also be used in implementing baggage features. For example, baggage operations can be invoked by a special sequence of signals from the user which also invoke the workspace exit procedure. Before proceeding with workspace exit, the baggage operations could provide a prompt asking the user to indicate the windows to be included in baggage, and the user could select each window, indicating whether it should be moved or copied into the next workspace entered. The workspace exit procedures could then store the data necessary to perform the requested move and copy operations upon entering the next workspace, and the workspace entry procedures could retrieve that data and delete and create placements accordingly.

At the completion of exit workspace procedure 204, the system is ready to enter another workspace or the overview. We turn now to enter workspace procedure 206.

3. Enter Workspace. Like exit workspace procedure 204, enter workspace procedure 206 may be invoked in a number of ways, each leading to substantially the same steps. One major objective of enter workspace procedure 206 is to produce a display closely resembling the display which existed when the user last exited from the workspace being entered. The same windows should be present, displayed in the same way and with the same apparent stacking order.

The implementation of exit workspace procedure 204 described above updates the workspaces data structure to include data necessary for regenerating substantially the same display at a later time. Enter workspace procedure 206, in regenerating the display, must reflect to an extent the steps taken in exit workspace procedure 204. It does so in a manner which also follows the general sequence in FIG. 4.

Figure 18A:
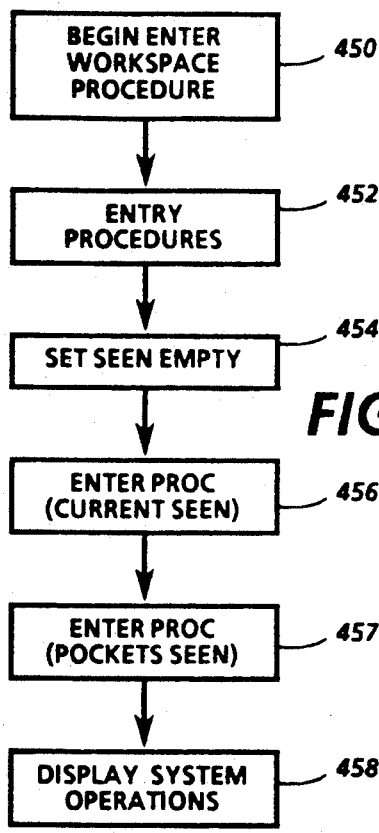
FIG. 18A is a flowchart showing steps for a routine for walking through a workspace data structure to enter a workspace.
Figure 18B:
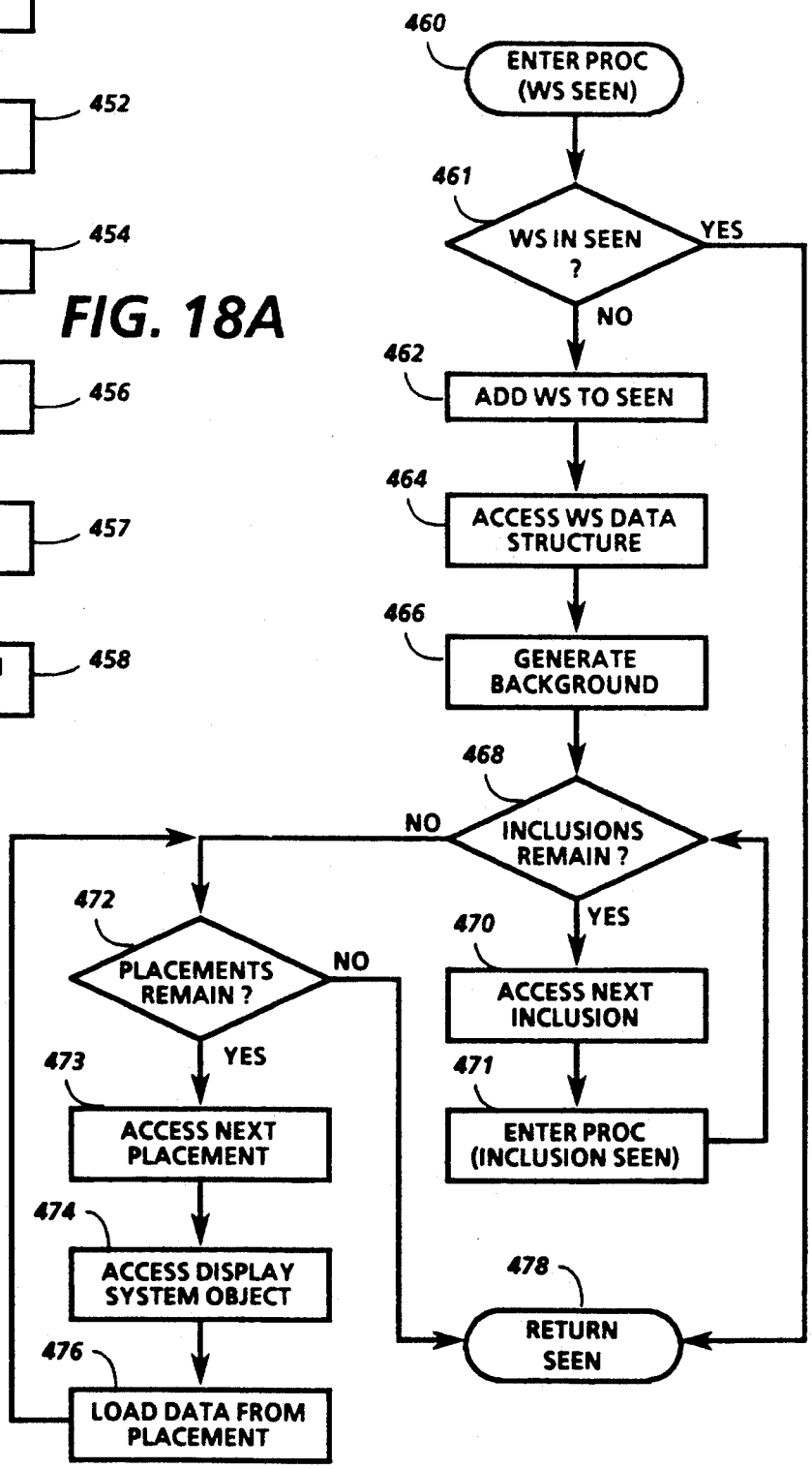
FIG. 18B is a flowchart showing steps of a recursive procedure called in FIG. 18A.

FIGS. 18A and 18B illustrate a procedure for entering a workspace which reflects the steps taken in the procedure of FIG. 13. The basic strategy of FIGS. 18A and 18B is to walk through the workspace data structures, displaying the window corresponding to each controlling placement from the bottom to the top.

The enter workspace procedure of FIG. 18A begins in box 450 when the exit workspace procedure is completed in response to a command to enter another workspace or when the overview is exited to enter a workspace. In either case, the identifier of a workspace to be entered will be provided, and certain other data will have been stored in exiting the previous workspace. The step in box 452 retrieves some of that data and takes preparatory steps based on it, such as determining whether the workspace being entered is different than the previous workspace so that a back door should be created, in which case a display system object for a back door is set up and linked by a placement to the workspace being entered. Other workspace entry procedures in box 452 may include creating placements for baggage from the previous workspace and setting up the system to operate in the workspace being entered, as discussed above. A list of workspaces visited during the recursive walk, designated the Seen list, is set empty in box 454. The step in box 456 then calls the recursive procedure EnterProc, providing the current workspace's handle and the Seen list. Upon receiving the Seen list back, the step in box 457 calls EnterProc, providing the handle of the pockets workspace and the Seen list. Upon completion, the workspace has been entered and display system operations resume in box 458. The workspace system in effect becomes dormant until the next sequence of user signals invoking workspace operations.

EnterProc procedure in FIG. 18B begins with a call with the handle of a workspace, WS, and the Seen list. The test in box 561 determines whether WS is in the Seen list. If not, WS is added to the Seen list in box 462 and the corresponding data structure is accessed in box 464. The background specification from that data structure is accessed in box 466 and used to generate any specified additional background features.

The test in box 468 determines whether any unexamined inclusions remain in the current workspace. If so, the next unexamined inclusion is accessed in box 470, and EnterProc is recursively called with the workspace handle from that inclusion, in box 471. Upon completion, the test in box 468 is repeated.

When no more inclusions remain in the current workspace, the test in box 472 determines whether any unexamined placements remain. If so, the next unexamined placement is accessed in box 473, and its handle is used in box 474 to access the corresponding display system object. The data from the placement is loaded into that display system object in box 476, and the display system object proceeds to display the appropriate display object with the display characteristics indicated in the placement. This effectively moves the display object back from the hiding place onto the display or otherwise makes it visible and changes its display characteristics in accordance with the placement. This step should be done without interrupting the operations of the display system object, so that continuity is maintained.

When all the placements in the current workspace have been examined, the procedure returns the Seen list, in box 478. If the test in box 461 determined that WS had already been visited, the procedure would immediately return.

As noted above, enter workspace procedure 206 can occur not only after exit workspace procedure 204 but also after exit overview procedure 214. Similarly, exit workspace procedure 204 can lead not only to enter workspace procedure 206 but also to enter overview procedure 210. We turn now to consider the overview-related procedures and other features of the overview in more detail.

E. The Overview

Some features of the overview are discussed above in relation to FIGS. 5-7. FIG. 11 shows the sequence of commands leading to the overview, and FIG. 14 shows a sequence of user signals which result in leaving a workspace and entering the overview.

The overview could be implemented in various ways. For example, the overview can be implemented as a unique workspace which has a unique set of display objects and, unlike the other workspaces, does not appear in the overview. It could also be implemented as a workspace like the other workspaces, so that the display objects in it could be moved and copied to other workspaces. The following description generally is based on the implementation of the overview as a unique workspace whose display objects are based on data stored in an overview cache which contains current versions of the workspace and window pictograms, to save time in entering the overview.

After briefly discussing further details of workspace and window pictograms, we will cover the operations available in overview interface mode 212 in one implementation of the overview according to the invention.

Figure 19:
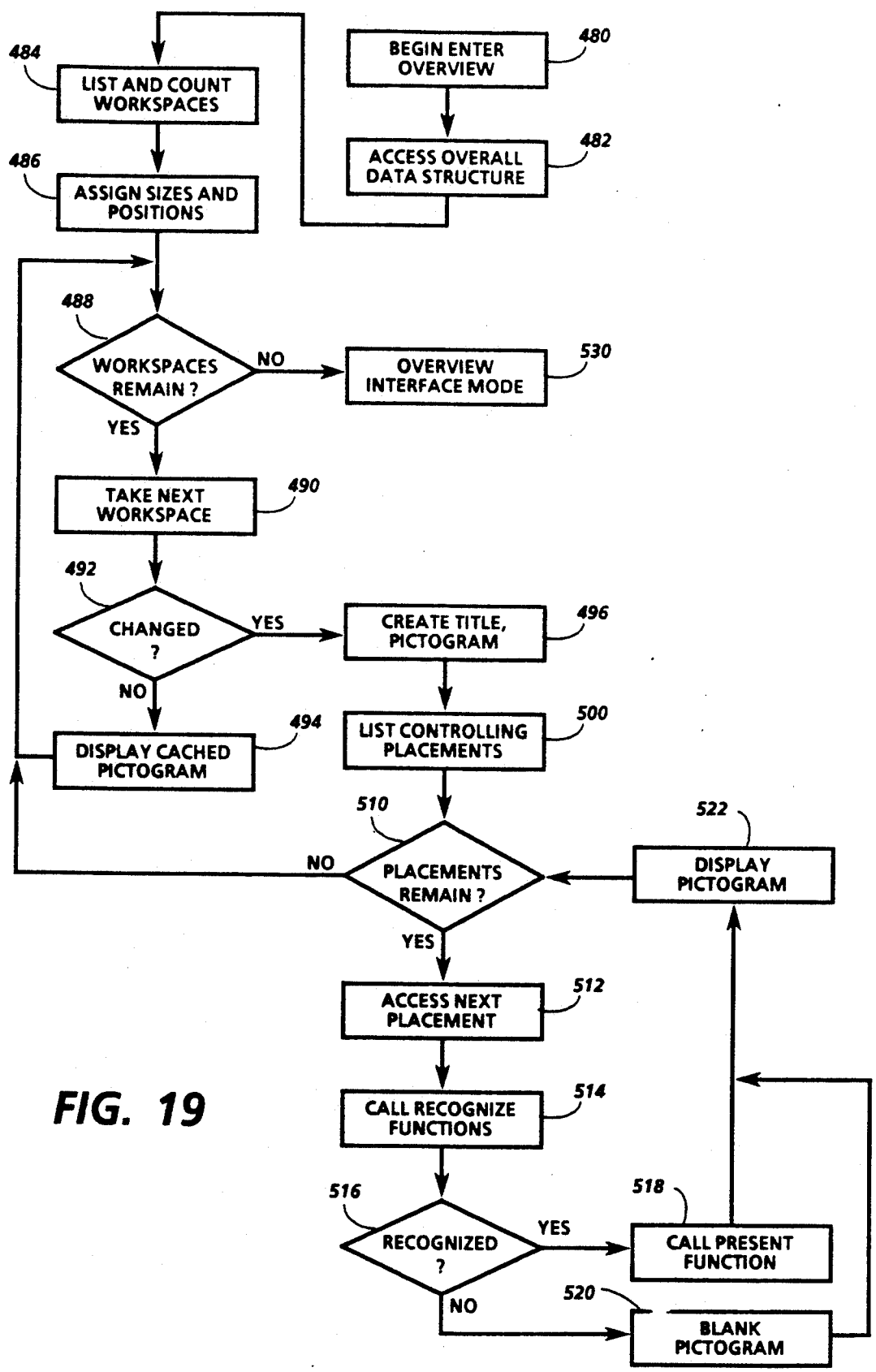
FIG. 19 is a flowchart showing steps for entering the overview.
Figure 20:
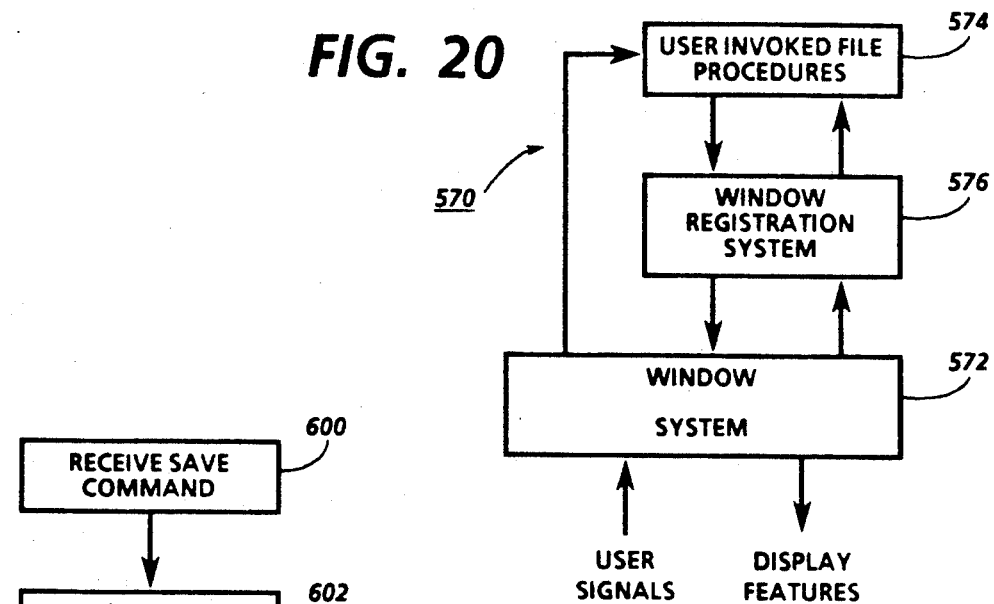
FIG. 20 is a schematic block diagram showing the window registration system.

1. Pictograms. The layout and detailing of pictograms is discussed briefly in relation to boxes 124 and 126 in FIG. 6. FIG. 19 illustrates in more detail the layout and detailing steps of FIG. 6.

The enter overview procedure of FIG. 19 begins in box 480, and initial steps as shown in boxes 120 and 122 in FIG. 6 include providing the overview background and title as well as the overview tools. The procedure then accesses the overall data structure which includes all the workspace data structures, in box 482. The workspaces are listed and counted in box 484. This list, unlike the workspace list discussed in relation to FIGS. 15A and 15B, may be based on alphabetical order, and may be created simply by sorting the overall data structure so that the workspace data structures are ordered alphabetically by workspace name. Then, in step 486, the sizes and positions of the workspace pictograms are determined based on the number of workspaces. In the example of FIG. 5, with eleven workspaces, positions and sizes are assigned so that three rows of four workspace pictograms each will fit within the available display area in the appropriate order, so that an area for the twelfth workspace pictogram is open. This corresponds to the layout step in box 124 in FIG. 6.

The details of each workspace's pictogram may be stored in an overview cache, as mentioned above. Therefore, to obtain the pictogram, the procedure of FIG. 19 checks whether the pictogram in the overview cache is accurate and, if not, recreates the entire pictogram in a manner very similar to the procedure of FIGS. 18A and 18B. The test in box 488 determines whether any unexamined workspaces remain on the list of workspaces, and if so the next workspace's data structure is accessed in box 490. The test in box 492 determines whether the workspace has been changed in a way which will affect the pictogram, testing whether the workspace was marked changed during an execution of the procedure of FIG. 13. If so, the procedure retrieves the cached pictogram and displays it at the appropriate position and size within the overview in box 494.

If the test in box 492 determines that the workspace has been changed, the procedure first sets up a blank pictogram with a title, in box 496. The step in box 500 lists the controlling placements as in FIGS. 15A, 15B and 16. In the process, however, the background of the blank pictogram is painted, as in box 466 in FIG. 18B.

If the test in box 510 determines that unexamined placements remain on the controlling placement list, the next unexamined placement is accessed in box 512. It is desirable to include in some of the window pictograms details about the display system objects which provide the corresponding windows, and this requires that the display system objects be accessed. As discussed in more detail below, an access of this nature is outside the normal display system operations, and requires special functions which are tailored to the type of display system object being accessed. A window registration system, discussed in detail below, includes a set of functions for each registered type of display system object, and one function for each type is capable of recognizing whether a given display system object is of that type. In box 514, the Recognize function for each of the types is called, together with the handle from the placement being examined. If any of the Recognize functions recognizes the display system object, in box 516, another function for that type, the Present function, is called in box 518. This Present function is tailored to retrieve from a display system object of that type any information to be displayed in its pictogram. If the display system object is not recognized, however, a blank pictogram is provided, in box 520.

The step in box 522 then displays the pictogram obtained in accordance with the position and size data in the placement. If the position of the placement is outside the boundaries of the workspace pictogram created in box 496, this step may also involve reshaping the workspace pictogram to include a virtual part.

When all the pictograms in the workspace pictogram have been displayed, the procedure returns to the test in box 488. And when all the workspaces on the alphabetical list have been visited, the overview is complete, and the overview interface mode 212 is entered in box 530. We turn now to the details of that mode.

2. Overview Interface Mode. When the overview is presented to the user, various operations are available which would be impossible or at least difficult when one of the workspaces is displayed. As noted above, the overview allows the user to navigate from one workspace to any other workspace, and assists the user in selecting a destination by presenting information about each workspace. Furthermore, if workspaces are implemented with a preexisting display system, the overview provides an opportunity to perform a number of operations not available during display system operations, including manipulations of placements, of workspaces and of collections of workspaces.

In one implementation, all of the pictograms are windows of the window system, with the window pictograms being superimposed on the workspace pictograms, and with all of the pictograms being displayed when the overview workspace is displayed. Each of these windows is provided by a corresponding display system object which receives and responds to user signals relating to that window. In this case, the overview interface mode is simply a special case of normal display system operations, and user signals relating to the pictograms and other overview display objects invoke appropriate procedures. The overview could be implemented in a number of other ways, however, and need not be part of normal display system operations.

FIG. 5, discussed above, shows overview 100, which includes some additional features. As mentioned immediately above, each workspace pictogram has a background, the background of control panel 102 being closely spaced parallel diagonal lines, for example. Window pictogram 530 and other window pictograms have additional detail based on data retrieved from the underlying display system object by the present function. Horizontally extended workspace pictogram 532 includes, in addition to that part of a workspace which is presented on the display, an additional area which shows a part of window pictogram 534 which extends beyond the displayed part, occupying a virtual part of that workspace. Similarly, vertically extended workspace pictogram 536 includes an additional area which shows a part of window pictogram 538 in a virtual part of the workspace.

Keyboard command buttons 540 provide a variety of overview interface operations. In general, overview 100 is designed to give the user an indication of each available operation and of each change of state which occurs while in overview interface mode. The actual implementation of overview 100 affects the manner in which a user invokes an operation as well as the display features indicating execution of that operation. For example, in one implementation a user selection of one of keyboard command buttons 540 does not directly invoke the corresponding operation, but rather results in a reminder in prompt window 114 of the keyboard sequence to invoke that operation. And whenever that operation is invoked, the corresponding keyboard command button is inverted, as shown for "Edit" button 542. and remains dark until the operation is completed.

We turn now to consider the operations which correspond to keyboard command buttons 540.

Some keyboard command buttons correspond to navigational operations. The "Enter" button, for example, corresponds to the basic navigational operation of entering a workspace. Therefore, when the enter operation is invoked and a workspace is selected, an exit overview procedure like that described in relation to FIG. 7 is performed and then an enter workspace procedure as in FIG. 18.

In order to select a workspace, the user moves a pointer using a mouse or other pointer control device until it points to the workspace pictogram corresponding to the workspace to be selected. Since each workspace pictogram is likely to contain one or more window pictograms, it is necessary to distinguish somehow between a workspace selection and a window selection when the pointer is pointing to a window pictograms. If the mouse has more than one button, one button can be used to indicate selection of the window pictogram and another to indicate selection of the workspace pictogram in which the window pictogram is located. Upon receiving a window pictogram selection, the corresponding placement is accessed based on information in the overview cache which indicates which placement corresponds to each region within each workspace pictogram.

A number of keyboard command buttons 540 correspond to operations which manipulate placements, and a placement to be manipulated is selected by selecting the corresponding window pictogram in the workspace pictogram of the workspace which contains it. The "Move" button corresponds to the operation of moving a placement to a selected location within the same workspace by modifying the placement or from one workspace to another selected workspace by deleting one placement and creating another linked to the other workspace. The "Copy" button with selection of a window pictogram corresponds to the operation of creating another placement linking the same display system object to another selected workspace. The "Shape" button corresponds to the operation of modifying a placement to a selected size, the size being selected by adjusting an outline of the window using the mouse. The "Delete" button with selection of a window pictogram corresponds to the operation of deleting the corresponding placement.

An operation which manipulates a placement, but which does so to assist navigation, is the expand operation, corresponding to the "Expand" button. The expand operation displays the full size current contents of a selected window at a location on the workspace pictogram to which it is linked by the selected placement. If the expand operation is invoked with selection of a window linked to an included workspace, the current contents are thus displayed full size at a position based on the placement but on the included workspace's pictogram rather than the workspace pictogram in which the selection was made. Since all the windows will be at the hiding place during overview interface mode, the expand operation can be performed by moving the selected window from the hiding place to the workspace pictogram to which it is linked. The expand operation is especially useful in finding a window based on its current contents.

Another placement manipulation operation which may be useful in navigation corresponds to the "Shares" button. This operation, after determining the selected placement, goes through the overview cache and finds all the other placements which contain the same handle. The window pictogram corresponding to each such placement is then made more visible, by blinking or the like, so that the user can identify all the workspaces that share that window.

Some of the workspace manipulation operations correspond to placement manipulation operations. For example, a copy or delete operation can be performed on a selected workspace by copying or deleting that workspace's data structure. In order to copy a workspace, however, it is necessary to assign a different name to the copy, so that the user will be asked to provide a name during the copy operation. The overview will be laid out again to accommodate the copied workspace. The "New" button corresponds to a similar operation which creates a new workspace and asks the user to provide a name. A variable can be set up to provide a default background specification and a list of inclusions that will automatically be included in a new workspace created in this manner. Similarly, the "Rename" button corresponds to an operation which asks the user to provide a new name for an existing workspace.

The "Edit" button corresponds to a workspace manipulation operation which permits the user to edit a workspace's data structure. It does so by displaying a description of the data structure within the corresponding workspace pictogram, as shown in pictogram 550 in FIG. 5. Pictogram 550 is thus a window in which interactive editing can be done, with the available commands appearing in adjacent edit menu 552. When editing is completed by an appropriate user signal, the workspace pictogram is generated again in accordance with the changed data structure. More than one workspace could be edited in this manner at a time, so that data could be copied from the description of one workspace's data structure to another's.

The remaining keyboard command buttons correspond to workspace manipulation operations which can assist in navigation and in understanding the connections between workspaces, either through doors or through inclusions. Each connection may be shown by a link which is a line with one end a light circle and the other end a dark circle. The "Doors" button corresponds to an operation which shows where each door in a selected workspace leads, the light circle of each link being at the door and the dark circle being on the workspace pictogram of the workspace to which that door leads. The "Doors to" button corresponds to the converse operation, linking all doors in other workspaces which lead to a selected workspace. The "All doors" button corresponds to an operation which links all doors and their destinations. The "Includes" button corresponds to an operation which links a selected workspace to all workspaces it includes, the light circle being in the including workspace and the dark circle in the included workspace. The "Included in" button corresponds to the converse operation, linking a selected workspace with all the workspaces which include it. And the "All inclusions" button corresponds to the operation of showing all inclusion relationships in this manner. In order to reduce viewer confusion, the links generated by the all doors and all inclusions operations are curved so that they do not overlap.

In addition to keyboard command buttons 540, save button 108, restore button 110 and augment button 112 invoke overview interface operations. The corresponding operations all relate to manipulation of a selected collection of workspaces. Because these operations relate to the more general topic of groups or suites of workspaces, we will treat them in the following section.

F. Suites of Workspaces

Generating a useful group or suite of workspaces involves a sufficient amount of effort that it is often worthwhile to preserve them. This requires not only that the windows or other display objects in the workspaces be preserved, but also that the placements, inclusions and other data in the workspace's data structures be preserved so that the effort of recreating those workspaces is not necessary. For example, a user may wish to backup on a file server a suite of workspaces which has been created in a work session. Or a user who has created a useful suite of workspaces may store them on a file server for copying by other users. This may be especially useful for transferring a useful suite of workspaces from an expert to each of a group of novices. Once a suite of workspaces has been stored as a file, it can be mailed or copied like any other file.

Useful operations on suites of workspaces include the save, restore and augment operations invoked respectively by save button 108, restore button 110 and augment button 112. Although these buttons are presented in the overview and are thus a part of the overview interface mode, some of the operations they invoke when selected could be available at other times through appropriate user signals. The save operation, for example, stores a selected group of workspaces in a designated file, together with the necessary data to regenerate those workspaces and the display objects they contain. Therefore, the save operation is useful at any time that it is desirable to back up a suite of workspaces or to make a suite of workspaces available for mailing or copying. The restore and augment operations, on the other hand, take a suite of workspaces from such a file and regenerate and present the workspaces to a user, the restore operation replacing the user's preexisting workspaces and the augment operation adding the regenerated suite of workspaces to the preexisting workspaces. These operations may be thought of as file operations because each involves storing data in a file or retrieving it from a file.

The data stored in or retrieved from a file by a file operation differs in one significant respect from the data in a workspace data structure: It includes not only the display characteristics from the underlying display system objects, but may also include data about the applications and other procedures which a display system object calls and the data structure a display system operates on in providing the contents of a window or other display object. This additional data may be necessary in order to recreate the display system object so that it can provide its display object within a recreated workspace. But the specific additional data which should be included in the file for a given display system object depends on the characteristics of the object. For some objects, no data should be stored, because the workspace system of any user who augments from the file will already contain an equivalent object, such as the user's mail facilities. In general, the context-dependent characteristics of the objects, including details like the user's name, should not be stored. For other objects, the entire display system object should be stored, because it is necessary for a task which the user will perform and the user's workspace system is unlikely to have an equivalent object. Indeed, a primary purpose of storing a suite of workspaces may be to provide a set of display system objects to an inexperienced user.

After discussing a window registration system which assists in obtaining the appropriate data from display system objects, we will discuss save, augment and restore operations which employ the window registration system.

1. Window Registration System. In order to obtain the appropriate data from each type of display system object, it is helpful to categorize the objects into types and provide a set of procedures for each type. For that purpose, one aspect of the present invention is to provide a window registration system, mentioned above in relation to providing window pictogram details which are similarly based on data from each type of display system object. This window registration system facilitates the process of retrieving data from display system objects by providing a set of functions appropriate for each of a number of types of display system object.

A window registration system is not necessary for the ordinary workspace operations described above because those operations involve data in the display system objects which are uniformly retrievable. In other words, the display system objects are structured so that the position, size, visibility (which may be collapsed into position), drop shadow data, shrinking data and other miscellaneous display characteristics are all retrievable by a procedure which is independent of which display system object is accessed. For example, this data could all be collected at the beginning of a data structure following the object's handle, so that it can be accessed and retrieved with the handle and without knowing the subsequent structure of the object. In fact, this is how conventional window systems are typically designed. But the window registration system is necessary to access and retrieve data from the subsequent part of the object because that part typically has a structure unique to that type of object.

FIG. 13 shows the relation between software components within a user interface system 570, including window system 572, user invoked file procedures 574 and window registration system 576. Underlying window system 572 provides the actual user interface, receiving user signals and presenting display features to the user. When the signals from the user invoke one of the file procedures, such as save, restore or augment, window system 572 calls user invoked file procedures 574, indicating which procedure is requested and providing any data necessary to that procedure's execution. During its execution, that procedure may require data from one of the display system objects in window system 572. That data is retrieved by calling appropriate functions from window registration system 576.

Window registration system 576 may be implemented in a number of ways. One implementation is a window type table containing a window type entry for each type of window. Each type entry includes a type handle or name which can be used to access that entry directly and a number of function handles which can be used to access the functions for that type. The display system object for each window of a given type responds to the same set of functions, so that the entry for that type can be set up by providing the type name and function handles for those functions.

The functions in the type table for each type may include, for example, a Recognize function, an Abstract function, a Recreate function and a Present function.

As discussed above in relation to box 516 in FIG. 19, the Recognize function of a given type, when it receives the handle of a window, accesses the corresponding display system object in window system 572 to determine whether it is of that type. The Recognize function may do this by interrogating the object for a particular function or other property, such as whether the object allows application code to be run in a window. If the Recognize function recognizes the object, it returns the handle of its type to the procedure which called it, so that the procedure can then call other functions for that type. If the Recognize function does not recognize the object, it returns a response indicating non-recognition, such as a Boolean value of false.

The Abstract function of a given type provides an abstract description of a display system object which can be stored in a file. The Abstract function receives the handle of a display system object, accesses that object to obtain the data needed to recreate that object subsequently, and provides the data in an appropriate form, including the type name. The Abstract function could, for example, retrieve characteristics of the data presented within the window provided by that object or other results of the current execution of an application called by that object. As noted above, the Abstract function should not retrieve context-dependent data, because that data will be different when the display system object is set up in a different environment.

The Recreate function of a given type reconstitutes a display system object of that type from its handle and the abstract description provided by the Abstract function. That abstract description may create the object from scratch or it may call applications and other procedures which are available in the user's environment to assist in recreating the object. It may not create a new object, but may rename an existing object or may obtain the handle of an existing object and provide that handle as the object's handle. The result is an object which fulfills a role in the workspace system.

The Present function of a given type, as mentioned in relation to box 518 in FIG. 19, provides data used in presenting a window's pictogram in the overview. As shown in FIG. 5, a number of the window pictograms are labeled with words like "TEdit", "Exec" and "Snap". These words refer to applications called by the display system objects which provide those windows, and the Present function of the appropriate type accessed each such display system object to find the name of the application called. This is an example of the type of data the Present function may retrieve.

In general, window registration system 576 can handle as many functions as appropriate. The functions described above are illustrative of the kinds of functions which are useful. The type table provides rapid selection of the appropriate function.

The type table is created during initialization in box 220 in FIG. 12 and is, in effect, supported by an application in the display system that contains all the functions of all the recognized window types. This application, referred to as the window type registrar, also includes loading code which sets up the type table to include the type name and function handles for each of the recognized types. Furthermore, if a new type of display system object is added to the window system, its functions must also be written together with loading code for calling the window type registrar to add a new entry to the type table containing the new type's name and the handles of its functions.

The above-described window registration system is used primarily in relation to the save, restore and augment operations.

Figure 21A:
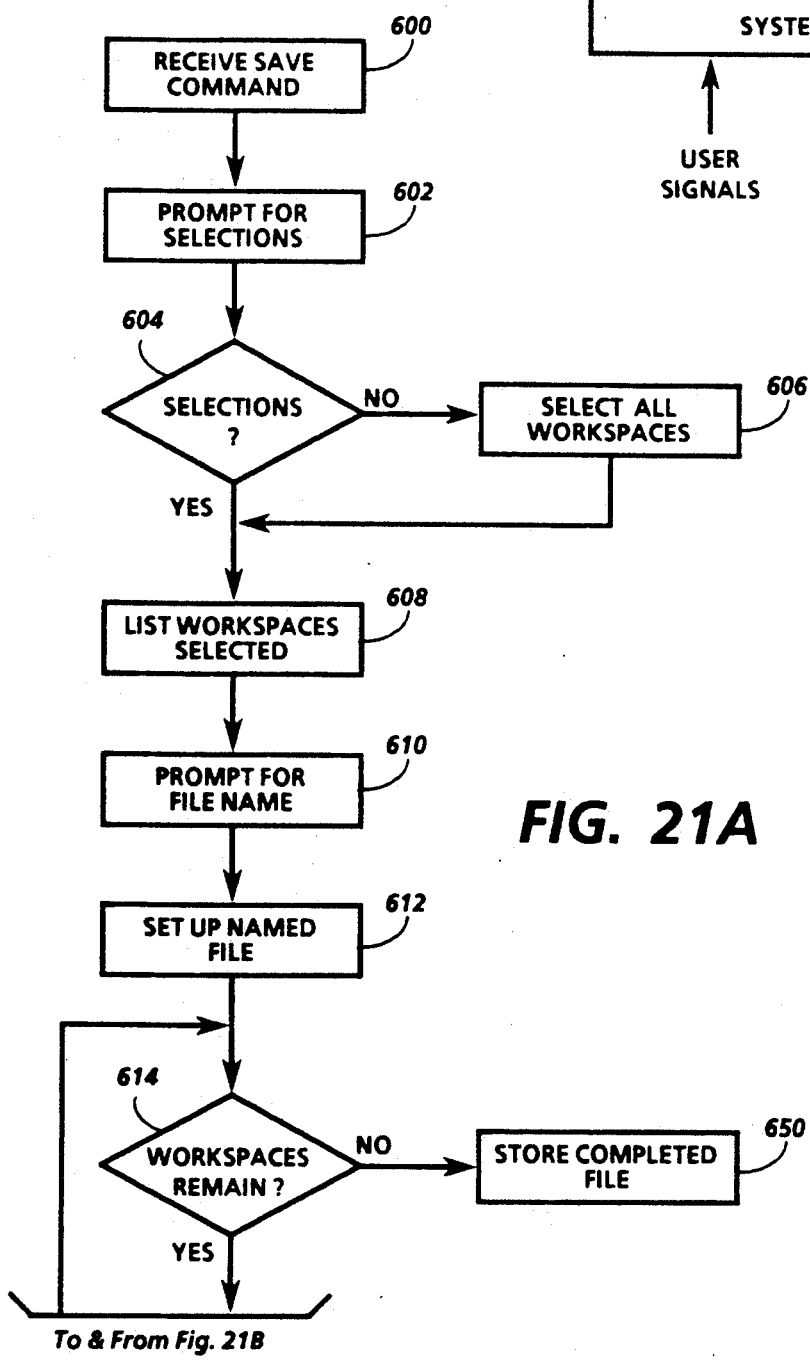
FIGS. 21 A-B are flowcharts showing steps for a save operation on workspaces.
Figure 21B:
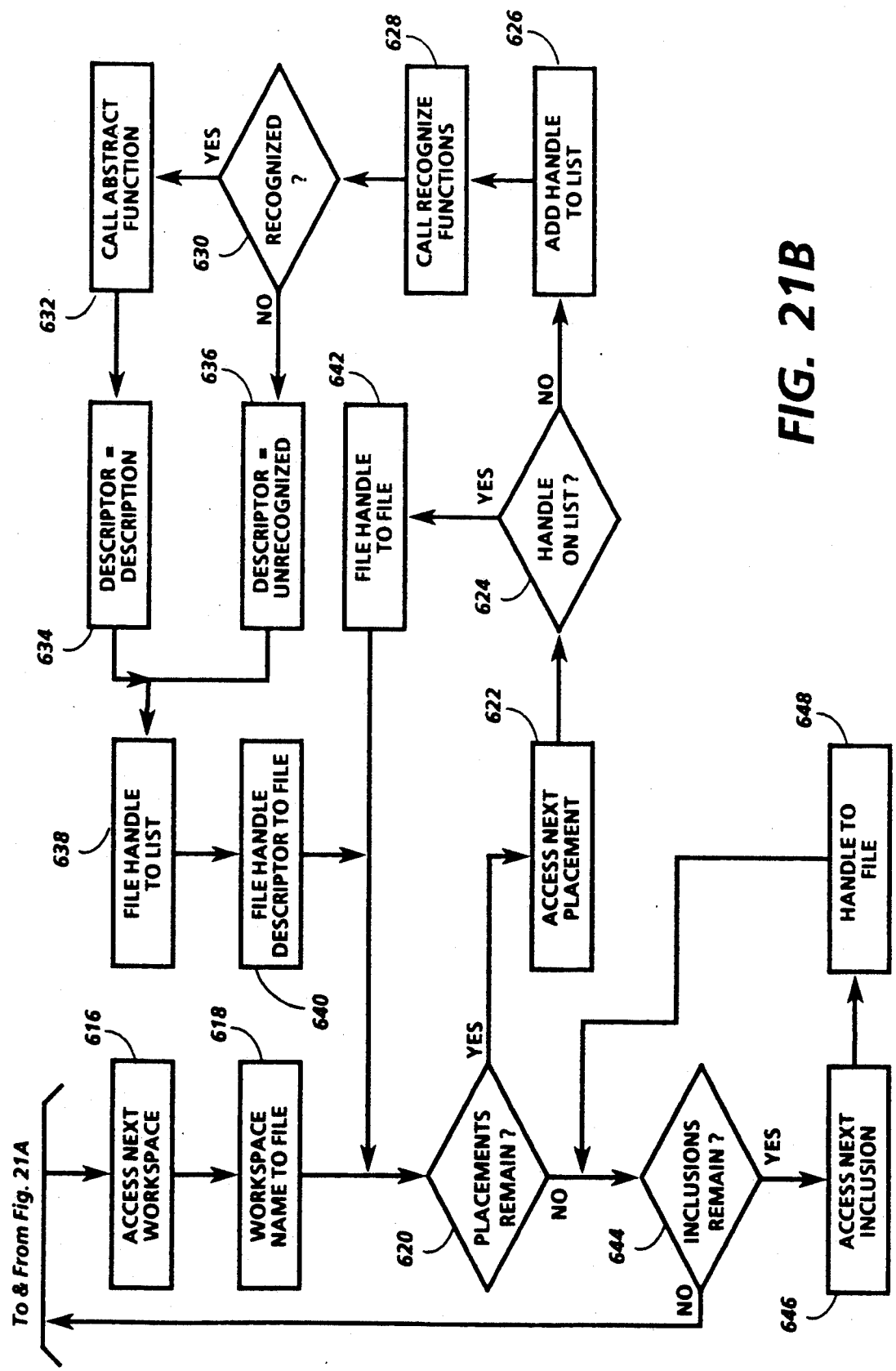
Figure 22:
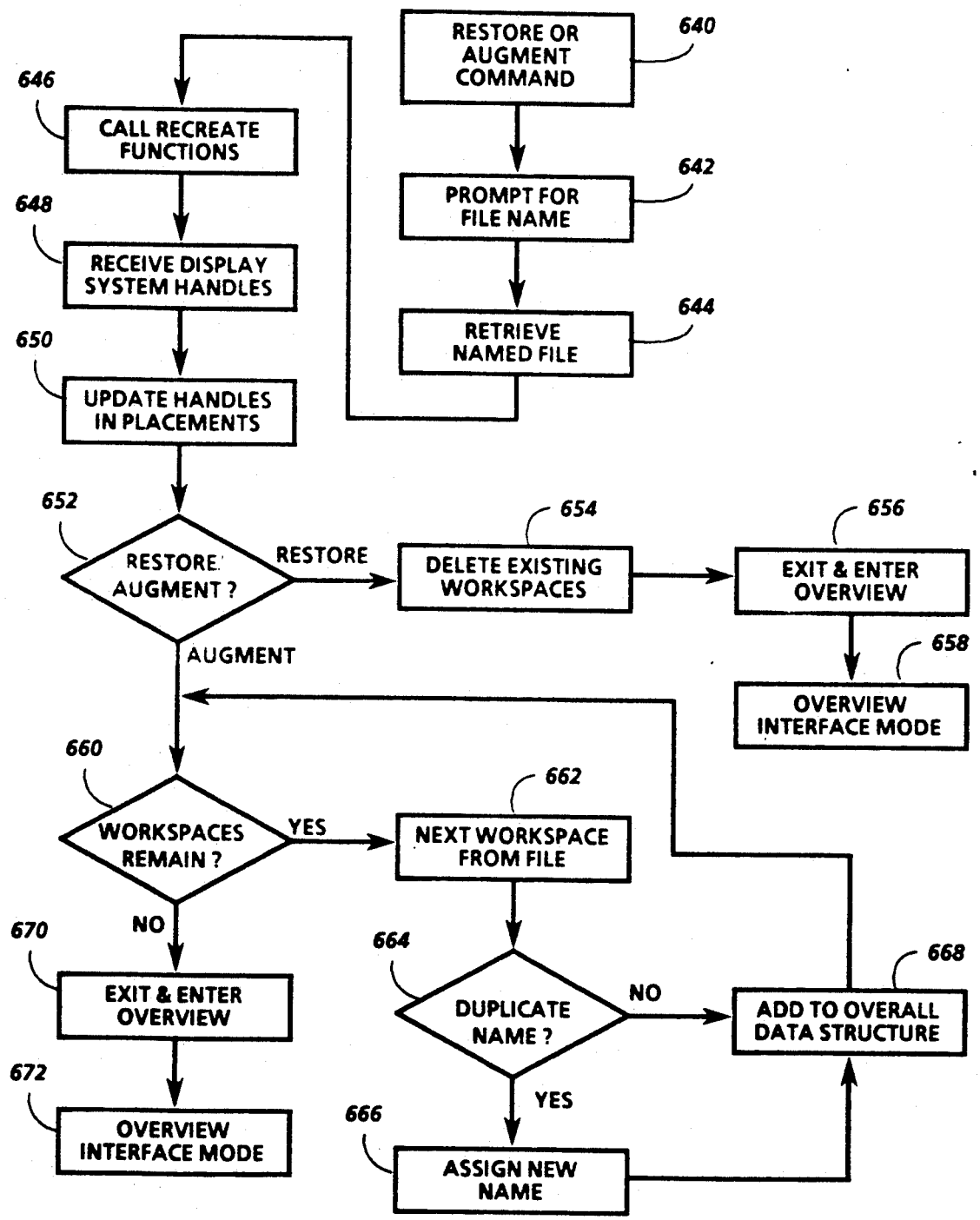
FIG. 22 is a flowchart showing steps for a restore operation and an augment operation on a saved file.

2. File Operations. Three file operations are provided in overview interface mode 212 by save button 108, restore button 110 and augment button 112. FIG. 21 illustrates the save operation, while FIG. 22 illustrates the restore and augment operations.

The procedure in FIG. 21, which implements the save operation, begins in box 600 when a save command is received. The procedure prompts the user to select workspaces to be included in the saved file, in box 602. The test in box 604 determines whether the user selected any workspaces. If not, all the currently existing workspaces are selected in box 606. In either case, a list of the selected workspaces is generated in box 608 for subsequent operations. In box 610, the procedure prompts the user to provide a file name, and a file with that name is then set up in box 612.

At this point the procedure of FIG. 21 begins to go through the list of workspaces generated in box 608. The test in box 614 determines whether any workspaces remain on the list. If so, the next workspace's data structure is accessed in box 616. The name or other handle of the workspace is written to the file being created locally in such a way that subsequent data items can be written behind it to complete a data structure depending from it. Then begins the process of writing that workspace's data structure to the file.

The test in box 620 determines whether that workspace's data structure has any remaining unexamined placements. If so, the next unexamined placement is accessed in box 622 and its handle is compared with the handles of placements on a list of placements whose corresponding display system objects have already been abstracted and written to the file, in box 624. If the handle is not yet on the handle list, it is added to the list in box 626.

The procedure then calls the Recognize function of each of the object types in the window registration system in turn. If any of the types recognizes the object, as determined in box 630, the Abstract function of that type is called in box 632 to obtain an abstracted description of the object from which it can be recreated. That description is then set to be the descriptor of the object, in box 634. If the object had not been recognized, the descriptor would be a code indicating that the object is of an unrecognized type and other appropriate data such as its title and other data from which it could be recreated if its type were registered, in box 636. In either case, a file handle to be used to access the descriptor in the file is generated and added to the handle list in a pair with the handle from the placement, in box 638. Then, the file handle is written to the file as a placement in the data structure of the workspace being examined, and a pair including the file handle and the descriptor is also written independently to the file, in box 640. Then the procedure returns to the test of box 620.

If the test in box 624 determines that the handle from the placement is already on the handle list, the corresponding file handle is retrieved from the handle list. That file handle is then written to the file as a placement in the data structure of the workspace being examined in box 642 before returning to the test of box 620.

When all of the placements in a workspace have been examined in this manner, the test in box 644 determines whether the workspace has any unexamined inclusions. If so, the next inclusion is accessed in box 646 and its handle is written to the file as an inclusion in the data structure of the workspace being examined in box 648 before returning to the test of box 644. When all the inclusions have been written in the manner, the procedure returns to the test of box 614.

When the test in box 614 determines that all the workspaces on the list have been examined, the file is complete. The completed file is then stored, in box 650. The procedure of FIG. 21 could also be structured to create an entire list of handles with descriptors without writing any data to the file. In that case, the file would be first constructed to include the handle/descriptor pairs, after which the procedure would scan through the workspace list to write out each workspace's name, followed by its placements and inclusions. In either case, when the file is stored in a file server or other appropriate location, it can be copied, mailed or otherwise accessed for subsequent operations.

As can be seen from the procedure of FIG. 21, none of the references to display system objects is permitted to dangle. In other words, every handle which is found in any of the placements in the selected workspaces results in the writing of a file handle/descriptor pair to the file. But any inclusion with a handle of a workspace which is not selected is permitted to dangle, meaning that the procedure makes no effort to add the included workspace to those selected or to change its handle to the handle of a selected workspace.

FIG. 22 illustrates procedures implementing the restore and augment operations which basically reverse the process in FIG. 21. The procedures of FIG. 22 begin in box 640 when a restore or augment command is received. The procedure prompts the user for the name of the file to be restored or augmented in box 642, and that file is retrieved in box 644. The file handle/descriptor pairs stored in it are used to recreate the corresponding display system objects by calling the appropriate Recreate functions in box 646. The descriptor includes, in each case, the type of the object, and that type's Recreate function can be called to recreate the object. It may do so by setting up any necessary applications and by taking other steps. But if the type is unrecognized, a default Recreate function is called to create an object of unregistered type. That object retains any other data included in the descriptor, and if that object's type is later added to the window registration system that object can be recreated.

As each object is recreated in box 646, it receives a display system handle, and that handle is used to create a list of pairs, each including a display system handle and a file handle, in box 648. This list is then used to change all the file handles in the workspace data structures to display system handles, in box 650. This step can be performed as the workspace data structures are retrieved from the file, so that when it is completed the workspace data structures have all been retrieved. At this point the inclusions may have dangling references, as noted above, if there were dangling references in the file.

The next step which is taken depends on whether the command was to restore or to augment, as shown by the branch in box 652. If the command was to restore, the preexisting workspaces are deleted in box 654 and the overall data structure from the file becomes the overall workspaces data structure. The procedure exits and reenters the overview in box 656 so that the overview display can be recreated and stored in the overview cache. Then the procedure reenters the overview interface mode in box 658.

If the command was to augment, the test in box 660 determines whether any of the workspace data structures from the file remain to be examined. If so, the next workspace data structure is accessed in box 662. Its name is compared with the names of preexisting workspaces in box 664, and if it is a duplicate, a new name is assigned to the workspace data structure from the file, in box 666. Finally, the workspace data structure is added to the preexisting overall workspaces data structure in box 668. When all the workspaces from the file have been added to the preexisting overall workspaces data structure, the procedure exits and reenters the overview in box 670 so that the overview display can be recreated and stored in the overview cache. Then the procedure reenters the overview interface mode in box 672.

The usefulness of the operations described in relation to FIGS. 21 and 22 can be better understood by considering the specific problems of how to set up workspaces for an inexperienced or naive user; how to enable a user to configure a suite of workspaces; and how to deliver applications within workspaces. An experienced or expert user creates a set of workspaces which includes a number of workspaces with windows appropriate for delivery. The application behind each window need not contain extensive data, since the function of the workspaces is to provide a blueprint or empty suite of workspaces including applications which a subsequent user will fill in with appropriate data. The expert then invokes a save operation on those workspaces, storing them as a suite of workspaces in a file on a file server. The recipient user, whether an inexperienced user or any other user receiving the saved suite of workspaces, then accesses the file server and invokes an augment operation on the file, causing the suite of workspaces to be added to the preexisting workspaces.

We turn now to a useful technique for delivering a suite of workspaces.

Figure 23:
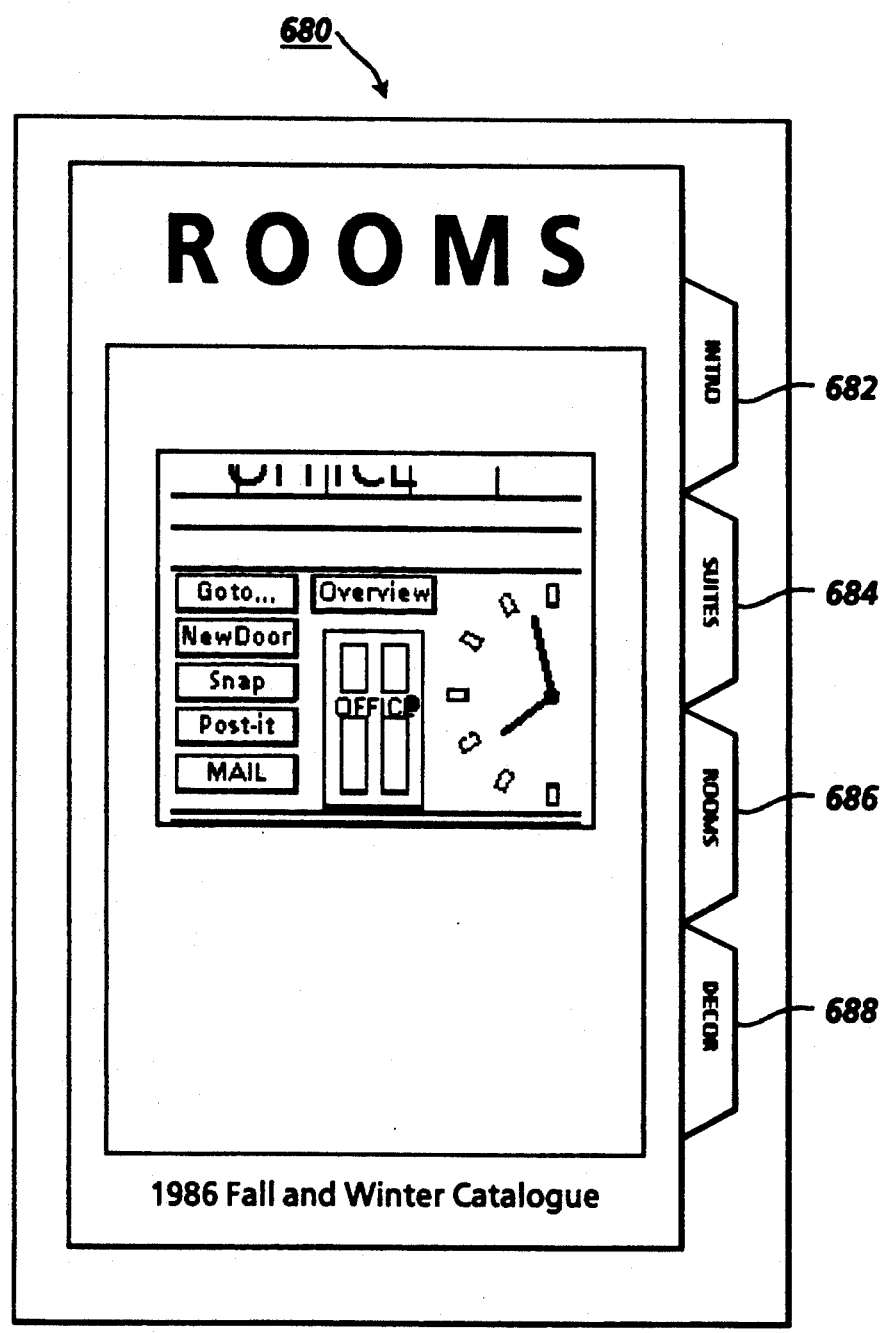
FIG. 23 shows a display object for delivering applications which may be used with the augment operation of FIG. 22.
Figure 24:
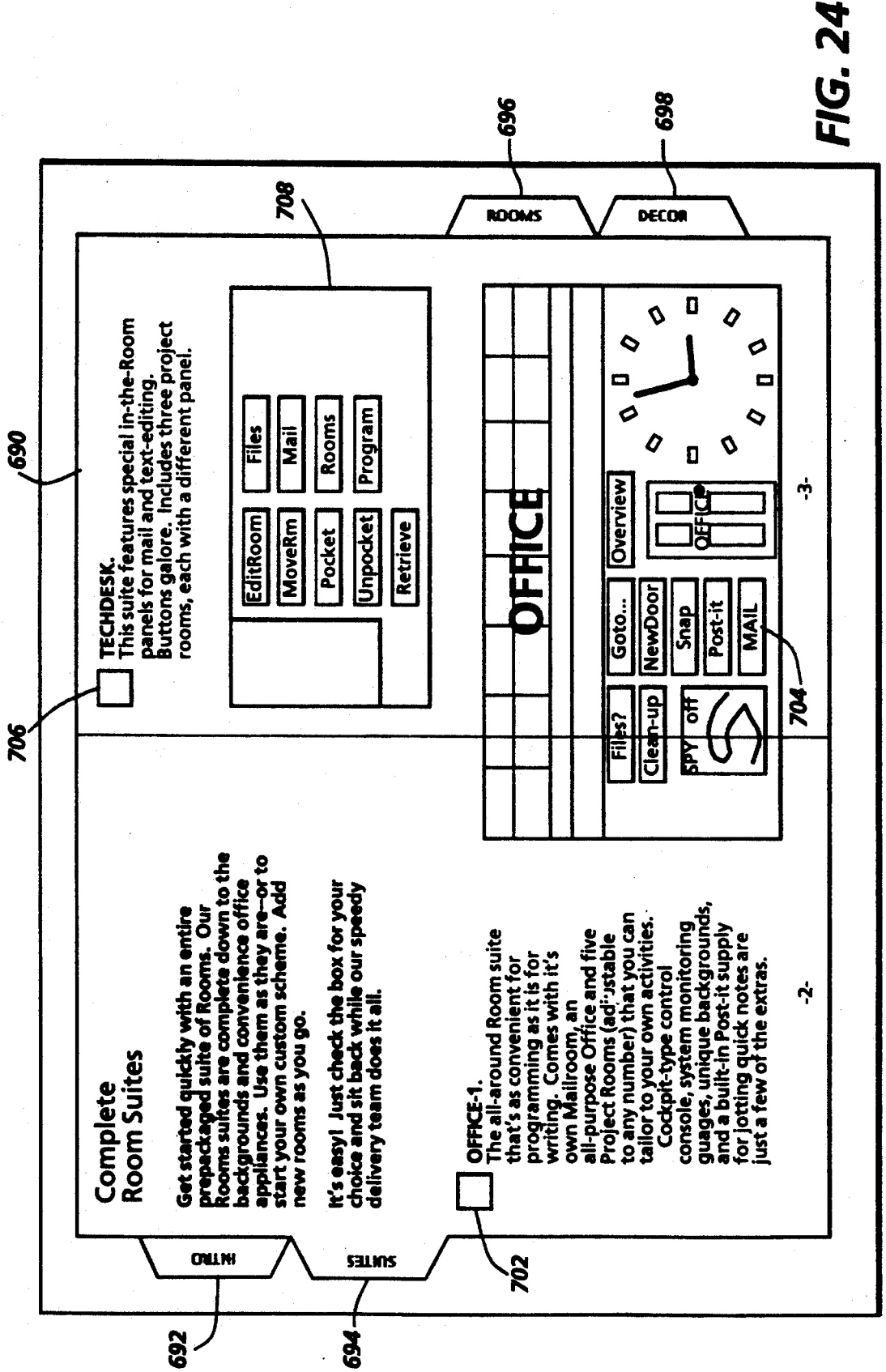
FIG. 24 shows another display object for delivering applications which is available from the display object of FIG. 23.

3. Catalogue. Delivery of a suite of workspaces may be implemented using a catalogue metaphor, as illustrated in FIGS. 23 and 24. In order to make the catalogue available to the user, a catalogue workspace is provided which includes a display object like catalogue cover 680 shown in FIG. 23. This catalogue workspace could, for example, be the initial workspace created during system setup as described in relation to FIG. 11, so that catalogue cover 680 would be presented to the user at the beginning of display system operation. Catalogue cover 680 bears the term "ROOMS" which, as noted above, is a trademark of Xerox Corporation used in connection with an implementation of the invention.

Catalogue cover 680 may be implemented as a window which includes a basic piece of bit map, together with a number of buttons attached to the basic bit map. As used here, the term "button" means a piece of bit map which can be positioned at the edge of or at a point within a larger piece of bit map and which, when selected by the user, results in the execution of an associated piece of software. The buttons attached to catalogue cover 680 are shown as tabs at the right side of FIG. 23, including introduction tab 682, suites tab 684, ROOMS tab 686 and decor tab 688. Each of these tabs, when selected, results in the execution of a corresponding routine.

FIG. 24 illustrates the result of selecting suites tab 684. Catalogue cover 680 is removed from the display and replaced by suites pages 690, another basic piece of bit map. Tabs 692, 694, 696 and 698 are buttons attached to suites pages 690 and correspond in function to tabs 682–288 in FIG. 23. Box 702 is also a button positioned within suites pages 690, and selecting it results in an augment operation which adds a suite of workspaces called Office—1 to the preexisting workspaces. At the conclusion of such an operation, the windows within the selected suite of workspaces will be opened and the workspaces will all be accessible. Suites pages 690 includes a piece of bit map 704 from one of the workspaces in Office—1, to suggest the tasks for which that suite of workspaces is useful. Similarly, Box 706 is a button within suites pages 690, and selecting it results in an augment operation adding a suite of workspaces called Techdesk, represented by a piece of bit map 708 from one of its workspaces.

Selecting introduction tab 682 or 692 results in introduction pages which explain to the user how to make use of the options presented within the catalogue metaphor. Selecting ROOMS tab 686 or 696 results in workspaces pages within which buttons are presented which when selected, augment a single workspace rather than a suite of workspaces. Selecting decor tab 688 or 698 results in decor pages within which buttons are presented which the user can select to modify the background pattern of a selected workspace. To further follow the catalogue metaphor, additional buttons with a piece of bit map which looks like a page corner can be used to permit page turning within each section of the catalogue.

The catalogue metaphor proves particularly useful as a technique for delivering applications in a system running workspaces, because of the augment operation. But it could be applied in other systems as well. One general feature of the catalogue metaphor which makes it useful is the uniform access it provides to all variations possible within the retrieved applications, including backgrounds and other display characteristics of the workspaces and the various suites of workspaces which are available.

In order to reach the catalogue, it may be appropriate for the user to go through preliminary steps, since not all users will want the catalogue. When the workspace system enters the initial workspace, a menu may be available to set up workspaces directly or to create doors to enter the catalogue or other special workspaces which assist a new user in understanding multiple workspaces.

We turn now to consider other characteristics of different implementations of the invention.

G. Implementations of Multiple Virtual Workspaces.

The invention has been implemented in two distinct systems. One is called "Desk Tops" and the other, as noted above, is called "ROOMS".

Desk Tops is implemented in the Cedar environment developed at the Palo Alto Research Center of Xerox Corporation. Desk Tops creates several virtual desktops, each of which appears to be a normal desktop when it is displayed. Desk Tops makes use of viewers, which are containers which resemble windows. A desktop is a special viewer which can contain a configuration of viewers, the viewers in a desktop being typically tiled in two columns on the screen.

Desk Tops provided for multiple desktops and commands for moving back and forth between desktops. Facilities are also available for moving and copying viewers between desktops and for placing viewers in iconic form. A particular viewer can be in more than one desktop, and it can have a different size and position in each desktop. The data structure for each desktop contains a placement in the form of a pointer to each contained viewer and the size and position of that viewer in that desktop. When the user switches between desktops, the current configuration of viewers is saved in the current desktop before moving the viewers in the new desktop onto the screen.

Desk Tops is implemented so that a number of functions relating to a given type of viewer are called using a registration system resembling the window registration system described above. In addition, a viewer is made invisible by resetting a boolean value in the display system object which provides it. Also, whenever a program prints to a viewer that is not on the screen, Desk Tops moves that viewer to the current desktop before printing to it, so that the user will be able to see what is printed.

Desk Tops does not have an overview, but if a user deletes a desktop which contains a viewer which is not on any other desktop, that viewer is moved onto the current desktop in iconic form so that it will not be stranded.

Deleting a viewer may result in deletion of that viewer in all the desktops containing it, but not in deletion of the placements.

ROOMS is implemented in teh version of Lisp marketed under the trademark Interlisp-D by Xerox Corporation. Interlisp-D has a number of unusual characteristics which affect the manner in which ROOMS is implemented. For example, all of the display objects in Interlisp-D are windows, with an icon being a special type of shrunken window; the underlying display system object remains active even in iconic form. The various windows in Interlisp-D can overlap freely, but a user selection in a given window will bring that window to the top of the display stack, through a default procedure.

Another characteristic of Interlisp-D windows is that a group of them can be attached so that they will be treated as a single display object. In that case, one of the windows controls the entire group, so that the controlling window becomes the window whose handle is used in the placement for that group. When the group is shrunk, it creates a single shrunken icon, which is a new window, so that the group of windows becomes invisible. Even then, however, the controlling window remains the window of interest. When performing workspace operations involving such a group, it is necessary to include in the placement data about whether shrunk, the size of the shrunken form, drop shadow and so forth, but it is not necessary to include the list of attached windows in the placement.

In Interlisp-D, it is possible to lock a window to a particular location on the screen. On the other hand, the only practical way to make a window invisible is to cause its display system object, also called a window, to provide its output to an invisible location, like the hiding place described above. In order to move a locked window to the hiding place, it is necessary to override the lock until the window is moved and then relock it.

ROOMS includes the overview, catalogue, sharing of display system objects, inclusions of workspaces and other features described in the preceding sections.

These two implementations each apply the invention to a preexisting display system. An implementation of the invention with such a display system may require minor modifications to fit the particular features of the display system. But the invention should be applicable to the conventional display systems now available.

H. Miscellaneous

Many other modifications, variations and extensions of the invention will be apparent to those skilled in the art from the above description. In many areas, a number of options are available for implementing a given feature, and the choice of an implementation depends on specific design factors.

As described above, a number of different sequences of user signals can lead to a workspace exit procedure. The background menu can be particularly important when in a workspace because it always permits the user to enter another workspace or the overview, so that the user can never be trapped in a workspace and unable to leave. In the overview, however, the background menu could be suppressed throughout the overview or within each workspace pictogram, because other steps can always be taken to leave the overview, such as using the enter operation to enter a workspace.

Another technique which protects the user from getting trapped is the back door. A back door can be automatically created whenever the user exits one workspace and enters another, either directly or through the overview. No back door would ordinarily be created, however, if the user reenters a workspace from itself. The workspace exit and entry procedures will determine whether to create a back door and, if so, where to locate it, according to any appropriate protocol.

Like other doors, the back door is a display object which, when selected, results in a switch out of the currently displayed workspace and into another workspace. A door is usually labelled with the name of the workspace to which it leads, and a display object analogous to a door could also be provided for entering the overview.

The background specifications in the workspace data structures can include various commands resulting in a distinctive appearance for each workspace. The whole background or a region can be shaded or tessellated. A frame can be created around a region with a specified width. A piece of bitmap or a string of text can be located within the background. As described above, background commands can be made conditional, as on whether the workspace is included in another workspace in the current display.

The overview also presents rich possibilities for variation. The operations available in the overview interface mode may be extended to include any convenient operation which assists the user in the use of the system, whether related to navigation or to another purpose.

An important potential extension of the invention is the sharing of a workspace by two or more users. This sharing could be done in a number of ways. Serial sharing could be provided by storing the workspace on a shared file server with a lock which the user would set when using the workspace and unlock when leaving the workspace. The user could use the save operation in the process of leaving the workspace to preserve the current state of the display objects. Simultaneous sharing could also be provided with a shared file server or with a remote procedure call. Simultaneous sharing of a workspace could be implemented by sharing all the windows in a workspace, along the lines of a multi-user interface, or by sharing the workspace itself.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A system comprising:
    a display;
    a plurality of workspace data structures, each workspace data structure relating to a respective workspace that can be presented on the display; each of the respective workspaces including a respective set of display objects; each of the display objects being perceptible as a distinct, coherent set of display features; the display objects of each respective set being perceptible as having spatial positions relative to each other when the respective workspace is presented on the display; the workspace data structures including a first workspace data structure relating to a first one of the respective workspaces, the respective set of display objects of the first workspace including a first display object;
    display object means for generating the display objects, each workspace data structure being linked to the display object means so that each display object in the respective set of display objects is included in the respective workspace when the respective workspace is presented; and
    control means for accessing the first workspace data structure and the display object means linked thereto for presenting the first workspace on the display, the first display object being presented within the first workspace at full size; the control means further being for accessing all of the workspace data structures for presenting representations of all of the respective workspaces simultaneously on the display, each workspace representation comprising a small-size representation of each display object in the workspace's respective set of display objects, the representation of the first workspace including a respective small-size representation of the first display object.

2. The system of claim 1, further comprising means for receiving signals from a user, the signals including a selection signal selecting one of the workspace representations for editing, the control means further responding to the selection signal by presenting on the display a description of the respective workspace data structure to be edited.

3. The system of claim 1, further comprising input means for receiving signals from a user, the signals from the user including a request to present the representations of all of the respective workspaces, the request being received while the first workspace is being presented, the control means further being for responding to the request by switching the display from presenting the first workspace to presenting the representations of all of the respective workspaces.

4. The system of claim 1, further comprising input means for receiving signals from a user, the signals from the user including a request to present the first workspace, the request being received while the representations of all of the workspaces are being presented, the control means further being for responding to the request by switching the display from presenting the representations of all of the respective workspaces to presenting the first workspace.

5. The system of claim 1 in which the small-size representation of the first display object includes a label identifying an application called by the display object means in generating the first display object, the control means further being for accessing the display object means to obtain the label identifying the application.

6. A method of operating a system that includes:
    a display;
    a plurality of workspace data structures, each workspace data structure relating to a respective workspace that can be presented on the display; each workspaces including a respective set of display objects; each of the display objects being perceptible as a distinct, coherent set of display features; the display objects of each respective set being perceptible as having spatial positions relative to each other when the respective workspace is presented on the display; the workspace data structures including a first workspace data structure with a respective first workspace, the respective set of display objects of the first workspace including a first display object; and
    display object means for generating the display objects, each workspace data structure being linked to the display object means so that each display object in the respective set of display objects is included in the workspace when the workspace is presented;
    the method comprising the steps of:
    accessing the first workspace data structure and the display object means linked thereto for presenting the first workspace on the display, the first display object being presented within the first workspace at full size; and
    accessing all of the workspace data structures for presenting representations of all of the respective workspaces simultaneously on the display, each workspace representation comprising a small-size representation of each display object in the workspace's respective set of display objects, the representation of the first workspace including a respective small-size representation of the first display object.

7. The method of claim 6 in which the system further includes input means for receiving signals from a user; the method further comprising the steps of:
while the first workspace is being presented, from the input means a request to present the representations of all of the respective workspaces; and
responding to the request by ceasing to present the first workspace and beginning to present the representation of all of the respective workspaces, the step of responding to the request comprising the step of accessing all of the workspace data structures.

8. The method of claim 6 in which the system further includes input means for receiving signals from a user; the method further comprising the steps of:
while the representations of all of the respective workspaces are being presented, receiving from the input means a request to present the first workspace; and
responding to the request by ceasing to present the representations of all of the respective workspaces and beginning to present the first workspace, the step of responding to the request comprising the step of accessing the first workspace data structure.

9. The method of claim 6 in which the plurality of workspace data structures includes a second workspace data structure with a respective second workspace, the system further including input means for receiving signals from a user; the method further comprising the steps of:
while the representations of all of the workspaces are being presented, receiving from the input means a request to transfer the first display object to the second workspace; and
responding to the request by linking the second workspace data structure to the display object means so that a second display object that is perceptible as the same tool as the first display object is in the respective set of display objects of the second workspace and by presenting updated representations of all of the respective workspaces, the updated representation of the second workspace including a small-size representation of the second display object.

10. The method of claim 9 in which the request to transfer the first display object to the second workspace is a request for a move operation.

11. The method of claim 9 in which the request to transfer the first display object to the second workspace is a request for a copy operation.

12. The method of claim 9 in which the plurality of workspace data structures includes a third workspace data structure with a respective third workspace, the third workspace data structure being linked to the second workspace data structure so that the respective set of display objects of the third workspace includes, for each of the display objects in the respective set of display objects of the second workspace, a respective display object that is percepitble as the same tool, the respective set of display objects of the third workspace therefore including, after the step of responding to the request, a third display object that is perceptible as the same tool as the first and second display objects; the updated representation of the third workspace including a small-size representation of the third display object.

13. The method of claim 6 in which the system further includes input means for receiving signals from a user; the method further comprising the steps of:
while the representations of all the workspaces are being presented, receiving from the input means a request to present the first display object at full size; and
responding to the request by presenting on the display the first display object at full size.

14. A method of storing data in a file, the data relating to a system that includes:
a display;
a first workspace data structure relating to a first workspace that can be presented on the display and a second workspace data structure relating to a second workspace that can be presented on the display; each of the first and second workspaces including a respective set of display objects; each of the display objects being perceptible as a distinct, coherent set of display features; the display objects of each respective set being perceptible as having spatial positions relative to each other when the respective workspace is presented on the display; and
display object means for generating first and second display objects, the display object means being linked with each of the first and second workspace data structures so that the first display object is in the respective set of display objects of the first workspace and the second display object is in the respective set of display objects of the second workspace;
the method comprising the steps of:
obtaining a descriptor of the display object means from which the display object means can be recreated and obtaining a file handle for the descriptor of the display object means, the file handle being for accessing the descriptor within the file; and
storing the descriptor in the file so that it can be accessed using the file handle and storing the descriptor's file handle in each of first and second saved data structures, the first and second saved data structures being for recreating the first and second workspace data structures respectively.

15. The method of claim 14 in which the display object means calls an application in generating the first and second display objects, the step of obtaining the descriptor comprising the substep of obtaining data about the application.

16. The method of claim 14 in which the display object means operates on a data structure in generating the first and second display objects, the step of obtaining the descriptor comprising the substep of obtaining data about the data structure.

17. The method of claim 14 in which the step of storing the descriptor in the file comprises the substep of storing the descriptor in a pair with the file handle.

18. The method of claim 14, further comprising the step of storing the file on a file server.

19. A method of operating a system that includes:
a display;
a processor for controlling the display; and
memory that can be accessed by the processor;

the memory storing a file that includes stored data relating to a first workspace that can be presented on the display and to a second workspace that can be presented on the display, each of the first and second workspaces including a respective set of display objects; each of the display objects being perceptible as a distinct, coherent set of display features; the display objects of each respective set being perceptible as having spatial positions relative to each other when the respective workspace is presented on the display; the file further including stored data relating to a display object generator for generating first and second display objects; the stored data comprising:

a descriptor from which the processor can recreate the display object generator, the descriptor being stored in the file so as to be accessible by the processor using a file handle for the descriptor; and a first saved data structure from which the processor can create a first workspace data structure relating to the first workspace and a second saved data structure from which the processor can create a second workspace data structure relating to the second workspace, the first and second saved data structures each including the file handle so that the processor can access the descriptor and link the recreated display object generator with each of the first and second workspace data structures to include the first display object in the respective set of display objects of the first workspace and to include the second display object in the respective set of display objects of the second workspace;

the method comprising acts of:

accessing the first and second saved data structures and the descriptor in the file;

recreating the display object generator based on the descriptor;

obtaining a system handle for accessing the recreated display object generator in the system; and creating the first and second workspace data structures based on the first and second saved data structures, respectively, the step of creating the first and second workspace data structures comprising the substep of replacing the file handle in the first and second saved data structures with the system handle of the display object generator.

20. The method of claim 19, in which the system further includes a preexisting workspace data structure; the method further comprising an act of deleting the preexisting workspace data structure from the system before the act of creating the first and second workspace data structures.

21. An article of manufacture for use in a system that includes a display and a processor for controlling the display; the article comprising:

memory that can be accessed by the processor;

workspace data stored by the memory; the workspace data relating to a first workspace that can be presented on the display and to a second workspace that can be presented on the display, each of the first and second workspaces including a respective set of display objects; each of the display objects being perceptible as a distinct, coherent set of display features; the display objects of each respective set being perceptible as having spatial positions relative to each other when the respective workspace is presented on the display;

a descriptor which the processor can use to create a display object generator for generating first and second display objects, the descriptor being stored in the file so as to be accessible by the processor using a file handle for the descriptor;

the workspace data comprising a first saved data structure that the processor can use to create a first workspace data structure relating to the first workspace and a second saved data structure from which the processor can create a second workspace data structure relating to the second workspace, the first and second saved data structures each including the file handle so that the processor can access the descriptor and link the display object generator with each of the first and second workspace data structures to include the first display object in the respective set of display objects of the first workspace and to include the second display object in the respective set of display objects of the second workspace.

22. The article of manufacture of claim 21 in which the descriptor is stored in a pair with the file handle.

* * * * *

UNITED STATES PATENT AND TRADEMARK OFFICE
CERTIFICATE OF CORRECTION

PATENT NO. : 5,233,687
DATED : August 3, 1993
INVENTOR(S) : D. Austin Henderson, Jr., Stuart K. Card It is certified that error appears in the above-identified patent and that said Letters Patent is hereby corrected as shown below:

Item [75] on the title page, ", Maxwell, III: John T., Sunnyvale, all" should be deleted and replaced by the word --both--, so that the list of inventors reads:

--D. Austin Henderson, Jr., Palo Alto;
Stuart K. Card, Los Altos Hills, both of Calif.--

At column 46, lines 43-44, delete "each workspaces including" and substitute therefor --each of the workspaces including--.

At column 47, line 11, delete "presented, from the" and substitute therefor --presented, receiving from the--.

At column 47, lines 15-16, delete "representation of all" and substitute therefor --representations of all--.

Signed and Sealed this

Third Day of May, 1994

*Attest:*

BRUCE LEHMAN

*Attesting Officer*       *Commissioner of Patents and Trademarks*